United States Patent
Yokota et al.

(10) Patent No.: US 9,439,027 B2
(45) Date of Patent: Sep. 6, 2016

(54) VALUE ACQUIRING METHOD, SENSOR CONTROL APPARATUS, SENSOR CONTROL METHOD, SENSOR CONTROL MEDIUM, AND ACQUISITION INTERVAL CONTROL MEDIUM

(75) Inventors: Koichi Yokota, Kawasaki (JP); Shinichi Shiotsu, Kawasaki (JP); Hiroyasu Sugano, Kawasaki (JP); Hideki Tanaka, Kawasaki (JP); Akira Itasaki, Kawasaki (JP); Daisuke Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 946 days.

(21) Appl. No.: 13/421,429

(22) Filed: Mar. 15, 2012

(65) Prior Publication Data
US 2012/0239297 A1    Sep. 20, 2012

(30) Foreign Application Priority Data
Mar. 18, 2011  (JP) .................. 2011-061761

(51) Int. Cl.
*H04W 4/00* (2009.01)
*G05B 15/02* (2006.01)

(52) U.S. Cl.
CPC .............. *H04W 4/006* (2013.01); *G05B 15/02* (2013.01); *Y02B 60/50* (2013.01)

(58) Field of Classification Search
CPC ...... H04W 4/006; G05B 15/02; Y02B 60/50
See application file for complete search history.

(56) References Cited

U.S. PATENT DOCUMENTS

| 5,548,578 A * | 8/1996 | Matsune ................ H04L 69/40 370/248 |
| 2004/0116786 A1 | 6/2004 | Iijima et al. |
| 2009/0303009 A1* | 12/2009 | Itasaki ..................... H04Q 9/00 340/10.1 |

FOREIGN PATENT DOCUMENTS

| JP | 2002-81958 | 3/2002 |
| JP | 2004-234622 | 8/2004 |
| JP | 2005-4522 | 1/2005 |
| JP | 2005-228174 | 8/2005 |
| JP | 2010-166151 | 7/2010 |
| JP | 2012-165249 | 8/2012 |
| WO | 2006/070895 A1 | 7/2006 |

OTHER PUBLICATIONS

Japanese Office Action issued Oct. 7, 2014 in corresponding Japanese Patent Application No. 2011-061761.

* cited by examiner

*Primary Examiner* — Mischita Henson
(74) *Attorney, Agent, or Firm* — Staas & Halsey LLP

(57) ABSTRACT

A sensor value is obtained by a sensor included in a terminal from among a plurality of terminals each of which includes the sensor, the acquired sensor value is stored along with an identifier used to identify a terminal with which the acquired sensor value was acquired, identifiers are extracted with which a difference of corresponding stored sensor values is equal to or smaller than a threshold value by comparing stored sensor values corresponding to different identifiers, an instruction for acquiring the sensor value is transmitted to at least one of the terminals corresponding to the extracted identifiers, and an instruction for extending an interval of acquiring the sensor value is transmitted to the terminals which are other than the at least one of the terminals corresponding to the extracted identifiers.

9 Claims, 14 Drawing Sheets

FIG. 3

| ID | TERMINAL NAME | TEMPERATURE DATA (°C) | SENSOR CONTROL | EXTRA ACQUISITION INTERVAL |
|---|---|---|---|---|
| 100 | A | 34 | ENABLE | —(NONE) |
| 110 | B | 32 | DISABLE | 5 sec |

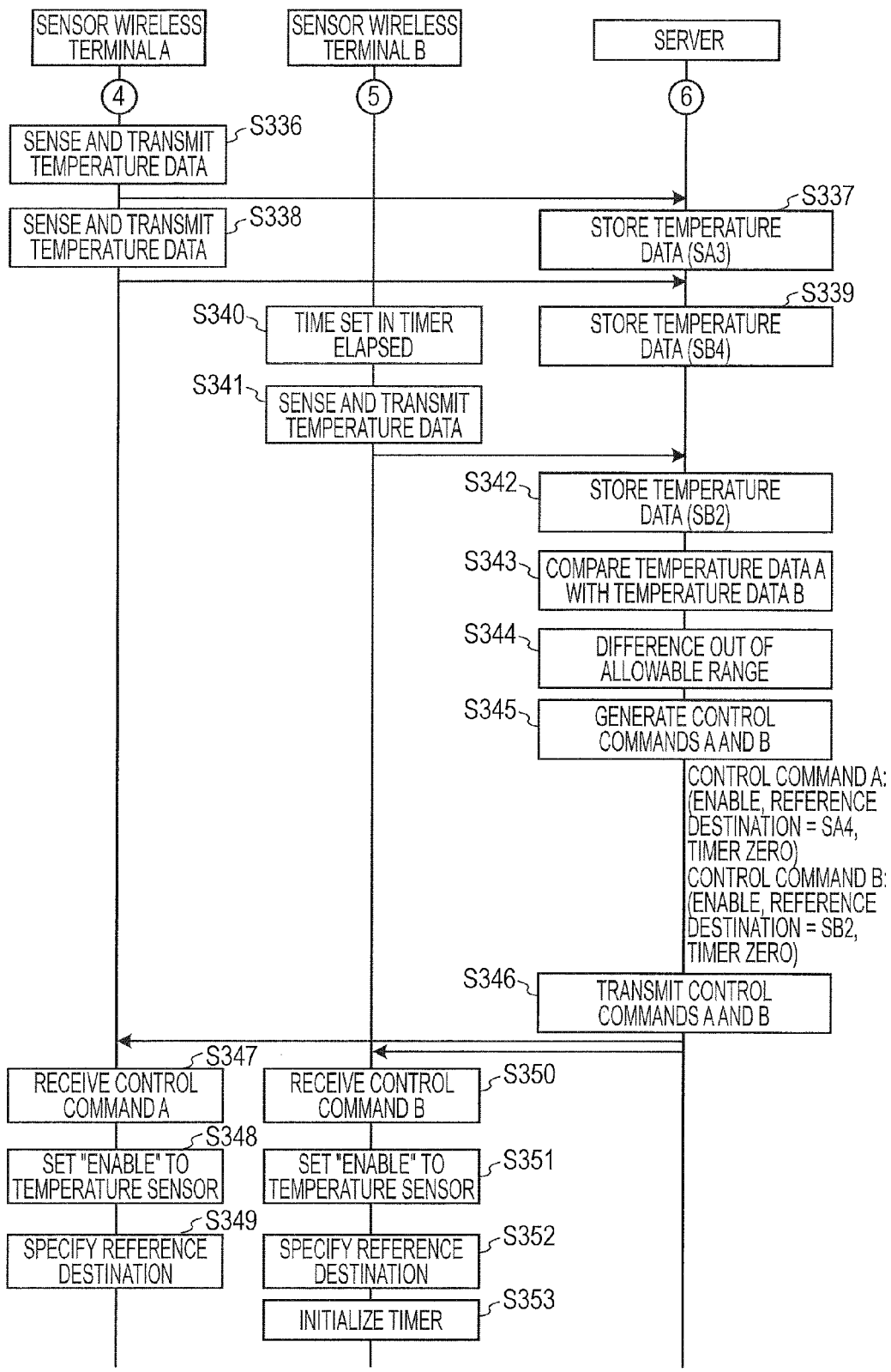

US 9,439,027 B2

VALUE ACQUIRING METHOD, SENSOR CONTROL APPARATUS, SENSOR CONTROL METHOD, SENSOR CONTROL MEDIUM, AND ACQUISITION INTERVAL CONTROL MEDIUM

CROSS-REFERENCE TO RELATED APPLICATION

This application is based upon and claims the benefit of priority of the prior Japanese Patent Application No. 2011-061761, filed on Mar. 18, 2011, the entire contents of which are incorporated herein by reference.

FIELD

The embodiments discussed herein are related to a sensor value acquiring method, a sensor control apparatus, a sensor control method, a sensor control medium, and an acquisition interval control medium.

BACKGROUND

In general, a sensor-mounted terminal which includes a sensor such as a temperature sensor, a humidity sensor, or an air pressure sensor disposed therein and which has a communication function has been used. Using such a sensor-mounted terminal, a sensor value obtained by a sensor at a predetermined interval is transmitted to a center server connected to the sensor-mounted terminal through communication network. An administrator who manages the center server recognizes states of areas around such terminals in accordance with such sensor values supplied from the terminals.

As described above, since a sensor-mounted terminal uses electric power for operating sensors and electric power for executing communications, a considerably larger amount of electric power is consumed when compared with a communication terminal which does not include a sensor or a sensor which does not have a communication function.

In recent years, a technique of reducing power consumption of such a sensor-mounted terminal has been disclosed. For example, the following technique has been used: A portable terminal which operates using a battery is installed in a certain region such that a user can reach the terminal and another portable terminal is installed in another region such that the user may not reach the terminal. In this state, when output values of two sensors are equal to or smaller than a predetermined value per a predetermined period of time, the terminals enter a power-off mode in a general technique.

SUMMARY

According to an aspect of the invention, a method includes, acquiring a sensor value obtained by a sensor included in each terminal from the terminals; storing the acquired sensor value along with an identifier used to identify each terminal; differentiating the stored sensor values, each of the stored sensor value corresponding to a different identifier and obtaining differences through the differentiating; extracting identifiers corresponding to the differences each of which is equal to or smaller than a threshold value; instructing at least one of the terminals corresponding to the extracted identifier to acquire a corresponding sensor value; and transmitting an instruction for extending a sensor value acquisition interval to the terminals which are other than the at least of terminals corresponding to the extracted identifier.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a diagram illustrating information stored in a temperature data table.

FIG. 7C is a sequence diagram illustrating the process executed by the system according to the first embodiment.

DESCRIPTION OF EMBODIMENTS

When power consumption is to be reduced using the same types of sensors, the reduction of the power consumption is limited for each terminal. Furthermore, since the same types of two sensors are mounted on the terminal, high cost is a matter of concern.

Hereinafter, embodiments of a sensor value acquiring method, a sensor control apparatus, a sensor control method, a sensor control medium, and an acquisition interval control medium will be described in detail with reference to the accompanying drawings. The embodiments discussed herein, each of a sensor wireless terminal includes sensor-mounted mobile node which communicates plural mobile stations by hand over.

First Embodiment

Entire Configuration

Figure 1:
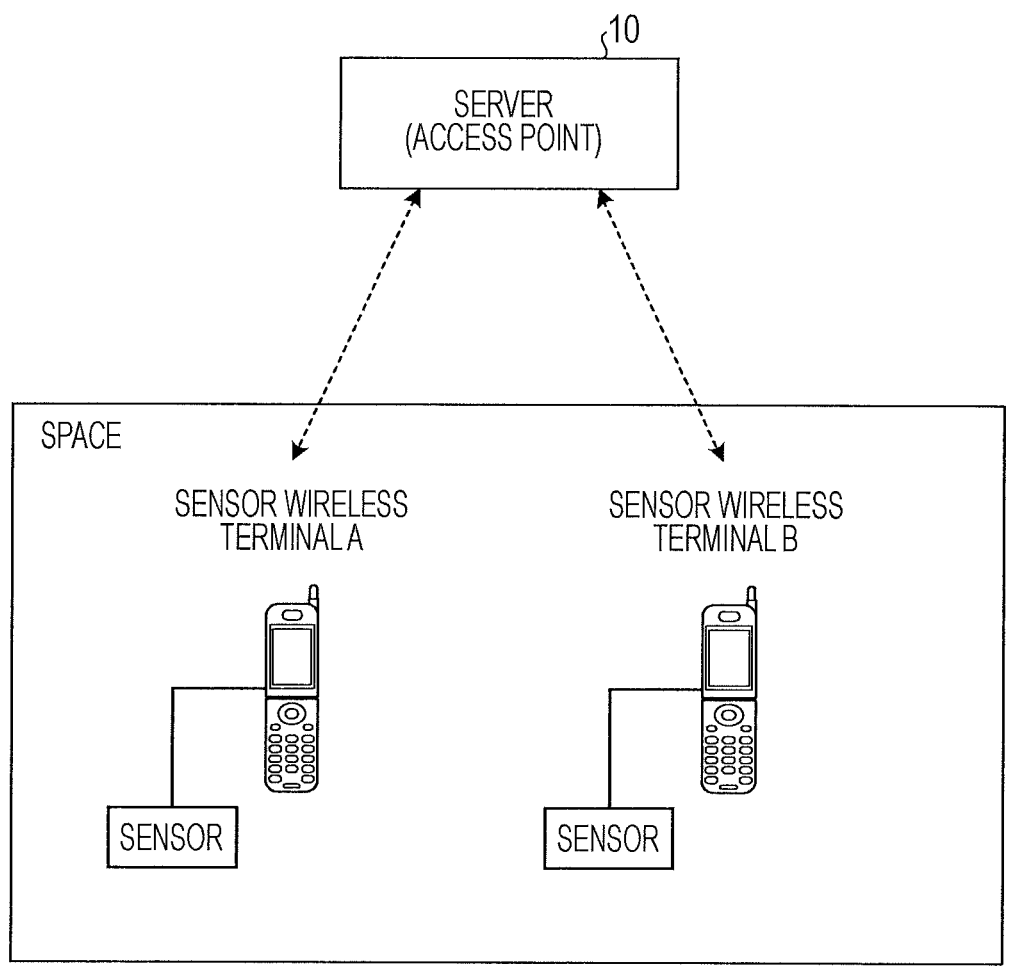
FIG. 1 is a diagram illustrating an entire configuration of a system according to a first embodiment.

FIG. 1 is a diagram illustrating an entire configuration of a system according to a first embodiment. As illustrated in FIG. 1, in this system, a server 10 and a sensor wireless terminal A are connected to each other through a wireless communication, and similarly, the server 10 and a sensor wireless terminal B are connected to each other through a wireless communication. Note that the number of the apparatuses and the communication method illustrated in FIG. 1 are merely examples and the embodiment is not limited to these.

Each of the sensor wireless terminals A and B includes sensors such as a temperature sensor, a humidity sensor, and an acceleration sensor. Furthermore, each of the sensor wireless terminals A and B has a WLAN (Wireless Local Area Network) function such as a Wi-Fi (Wireless Fidelity) function. Each of the sensor wireless terminals A and B executes sensing using the sensors at a predetermined interval and transmits sensor values obtained through the sensing to the server 10 at a predetermined interval.

Furthermore, the sensor wireless terminals A and B are installed in the same space or held by persons in the same space. Examples of the space include a data center, a classroom, a theater, and a train. Moreover, other examples of the space include a range in which wireless communication can be performed using a single access point, that is, a region which is managed by a single access point.

The server 10 has a function as an access point for a wireless communication and receives the sensor values from the sensor wireless terminals A and B at a predetermined interval. The sensor values obtained by the server 10 are used by an administrator and the like. For example, when the server 10 receives temperature information, air conditioning is performed in accordance with the temperature information.

The server 10 stores sensor values obtained from sensor wireless terminals in a table along with identifiers used to identify the sensor wireless terminals. Subsequently, the server 10 differentiates the stored sensor values having the different identifiers with one another and extracts identifiers having a difference which is equal to or smaller than a threshold value. Thereafter, the server 10 instructs at least one of the sensor wireless terminals having the extracted identifiers to obtain a sensor value and instructs the other of the sensor wireless terminals having the extracted identifiers to extend a sensor-value acquisition interval.

As described above, when a difference between sensor values obtained from wireless communication terminals having the same type of sensor is small, the server 10 transmits an instruction for obtaining a sensor value to one of the sensor wireless terminals and transmits an instruction for extending a sensing interval to the other of the sensor wireless terminals. As a result, the server 10 may normally obtain a sensor value from one of the sensor wireless terminals while suppressing power consumption of the other of the sensor wireless terminals corresponding to the extended sensing interval. Accordingly, electric power saving is realized in a unit of a group of terminals.

Configuration of Apparatus

Next, the server 10 and the sensor wireless terminals A and B will be described in detail using concrete examples. Here, a configuration of the server 10, configurations of the sensor wireless terminals A and B, processing flows, and advantages will be described. Note that, in this embodiment, a case where each of the sensor wireless terminals A and B includes a temperature sensor and transmits sensed temperature information to the server 10 will be described. Furthermore, since the sensor wireless terminals A and B have the same configuration, the sensor wireless terminals A and B are collectively referred to as a sensor wireless terminal 30 hereinafter.

Configuration of Server

Figure 2:
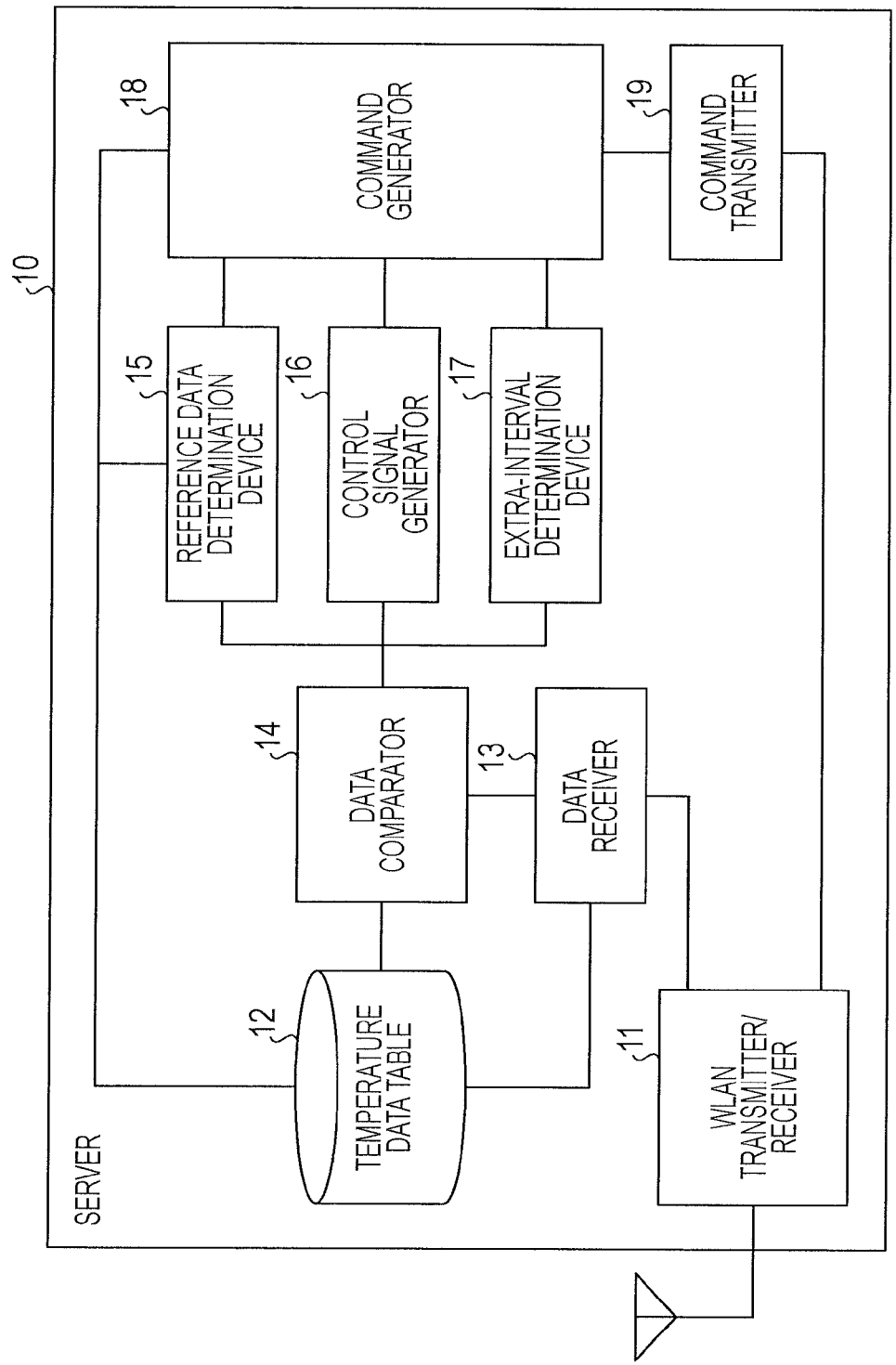
FIG. 2 is a block diagram illustrating a configuration of a server according to the first embodiment.

FIG. 2 is a block diagram illustrating a configuration of the server 10 according to the first embodiment. As illustrated in FIG. 2, the server 10 includes a WLAN transmitter/receiver 11, a temperature data table 12, a data receiver 13, a data comparator 14, a reference data determination device 15, a control signal generator 16, an extra-interval determination device 17, a command generator 18, and a command transmitter 19.

The WLAN transmitter/receiver 11 serves as a communication interface which connects the sensor wireless terminals A and B to a wireless communication. For example, the WLAN transmitter/receiver 11 establishes a wireless communication using the Wi-Fi, for example, between the sensor wireless terminals A and B and executes transmission and reception of data between the sensor wireless terminals A and B.

The temperature data table 12 stores temperature information obtained from the sensor wireless terminals A and B. FIG. 3 is a diagram illustrating information stored in the temperature data table 12. As illustrated in FIG. 3, the temperature data table 12 stores an "ID", a "terminal name", "temperature data (° C.)", "sensor control", and an "extra acquisition interval" which are associated with one another. Note that the information is stored by the data receiver 13 in the temperature data table 12 which will be described hereinafter. Furthermore, the information illustrated in FIG. 3 is merely examples, and the information is not limited to this and may be arbitrarily set and changed. For example, the temperature data table 12 may store information used for communication such as IP (Internet Protocol) addresses of the sensor wireless terminals A and B.

The stored "ID" which is an identifier used to identify a sensor wireless terminal 30 may be assigned when the WLAN transmitter/receiver 11 establishes a wireless communication or may be set in advance. The "terminal name" representing a name of a device specifying a sensor wireless terminal 30 may be obtained by the WLAN transmitter/receiver 11 through a wireless communication or may be obtained in advance. The "temperature data (° C.)" representing a sensor value sensed by a sensor wireless terminal 30 is stored by the data receiver 13 or the like which will be described hereinafter. The "sensor control" representing a sensing instruction supplied to a sensor wireless terminal 30 is stored by the command generator 18 or the like. The "extra acquisition interval" which represents a period of time in which a sensing interval is extended and which is supplied to a sensor wireless terminal 30 is stored by the command generator 18 which will be described hereinafter or the like.

In a case of the first row in FIG. 3, temperature data of "34° C." is obtained from the sensor wireless terminal A having an ID of 100 assigned thereto, an "enable signal" is supplied as sensor control to the sensor wireless terminal A, and information representing "extra acquisition interval=none" is supplied to the sensor wireless terminal A. In a case of the second row in FIG. 3, temperature data of "32° C." is obtained from the sensor wireless terminal B having an ID of 110 assigned thereto, a "disable signal" is supplied as sensor control to the sensor wireless terminal B, and information representing "extra acquisition interval=5 seconds" is supplied to the sensor wireless terminal B.

The data receiver 13 receives sensor values from the sensor wireless terminals A and B through the WLAN transmitter/receiver 11. For example, the data receiver 13 receives a packet including temperature data added thereto from each of the sensor wireless terminals A and B. Then the data receiver 13 extracts the ID from a header or the like of the packet, associates the extracted ID with the received temperature data, and stores the ID and the temperature data in the temperature data table 12.

The data comparator 14 performs, when the temperature data table 12 is updated, comparison of temperature data stored in the temperature data table 12. For example, the data comparator 14 refers to the temperature data table 12 so as to extract temperature data (SA) of the sensor wireless terminal A and temperature data (SB) of the sensor wireless terminal B. Thereafter, the data comparator 14 calculates a difference between the temperature data SA and the temperature data SB and determines whether the calculated difference is smaller than a threshold value such as 1° C.

Subsequently, when it is determined that the calculated difference is smaller than the threshold value, the data comparator 14 determines that an acquisition interval of the sensor wireless terminal A is maintained and outputs the determination to the reference data determination device 15, the control signal generator 16, and the extra-interval determination device 17. Furthermore, when it is determined that the calculated difference is equal to or larger than the threshold value, the data comparator 14 determines that the acquisition interval of the sensor wireless terminal A and an acquisition interval of the sensor wireless terminal B are initialized and outputs the determination to the reference data determination device 15, the control signal generator 16, and the extra-interval determination device 17. Note that a determination as to whether the acquisition interval of the sensor wireless terminal A or the acquisition interval of the sensor wireless terminal B is maintained when the difference calculated by the data comparator 14 is smaller than the threshold value may be arbitrarily made by the user.

The reference data determination device 15 determines a reference destination of a sensing application which operates in each of the sensor wireless terminals A and B. It is assumed that the reference data determination device 15 receives a notification representing that the acquisition interval of the sensor wireless terminal A is to be maintained from the data comparator 14. In this case, the reference data determination device 15 outputs information representing that the sensor wireless terminal A refers to the temperature data of itself to the command generator 18. Furthermore, the reference data determination device 15 outputs information representing that the sensor wireless terminal B refers to the temperature data of the other terminal to the command generator 18.

On the other hand, it is assumed that the reference data determination device 15 receives a notification representing that the acquisition intervals of the sensor wireless terminals A and B are to be initialized from the data comparator 14. In this case, the reference data determination device 15 outputs information representing that the sensor wireless terminal A refers to the temperature data of itself to the command generator 18. Furthermore, the reference data determination device 15 outputs information representing that the sensor wireless terminal B also refers to the temperature data of itself to the command generator 18.

The control signal generator 16 generates a control signal representing whether each of the sensor wireless terminals A and B is caused to perform sensing. In the example described above, it is assumed that the reference data determination device 16 receives the notification representing that the acquisition interval of the sensor wireless terminal A is to be maintained from the data comparator 14. In this case, the control signal generator 16 generates an "enable signal" representing permission of sensing for the sensor wireless terminal A and outputs the "enable signal" to the command generator 18. Furthermore, the control signal generator 16 generates a "disable signal" representing inhibition of sensing for the sensor wireless terminal B and outputs an instruction for generating a command to the command generator 18.

The extra-interval determination device 17 determines extra intervals of sensing performed by the sensor wireless terminals A and B. In the example described above, it is assumed that the extra-interval determination device 17 receives the notification representing that the acquisition interval of the sensor wireless terminal A is to be maintained from the data comparator 14. In this case, the extra-interval determination device 17 outputs information representing that it is determined that the sensor wireless terminal A performs sensing with an initial value, that is, without extension of the interval to the command generator 18. Furthermore, the extra-interval determination device 17 outputs information representing that it is determined that the sensing interval of the sensor wireless terminal B is extended by 5 seconds to the command generator 18.

In this case, it is assumed that the extra-interval determination device 17 consecutively receives a notification representing that the acquisition interval of the sensor wireless terminal A is maintained from the data comparator 14. In this case, the extra-interval determination device 17 outputs information representing that it is determined that the sensor wireless terminal A performs sensing with the initial value to the command generator 18. Furthermore, the extra-interval determination device 17 outputs information representing that it is determined that the sensing interval of the sensor wireless terminal B is further extended by 10 seconds to the command generator 18.

The command generator 18 generates a command in accordance with the commands and the instructions supplied from the reference data determination device 15, the control signal generator 16, and the extra-interval determination device 17. In the example described above, the command generator 18 generates a control command A representing "reference temperature data=temperature data SA of itself, control signal=enable signal, and extra acquisition interval=none" for the sensor wireless terminal A. Furthermore, the command generator 18 generates a control command B representing "reference temperature data=temperature data SA of the other sensor wireless terminal, control signal=disable signal, and extra acquisition interval=5 seconds" for the sensor wireless terminal B. Note that the command generator 18 transmits the control commands A and B and the transmission destinations to the command transmitter 19.

The command transmitter 19 transmits the control commands A and B generated by the command generator 18 to the sensor wireless terminals A and B, respectively, through the WLAN transmitter/receiver 11. For example, the command transmitter 19 obtains "IDs" and "terminal names" from the command generator 18 as the transmission destination. The command transmitter 19 specifies an IP address from the temperature data table 12 or the like using the information as a key and transmits a corresponding control command to the specified IP address.

Configuration of Sensor Wireless Terminal

Figure 4:
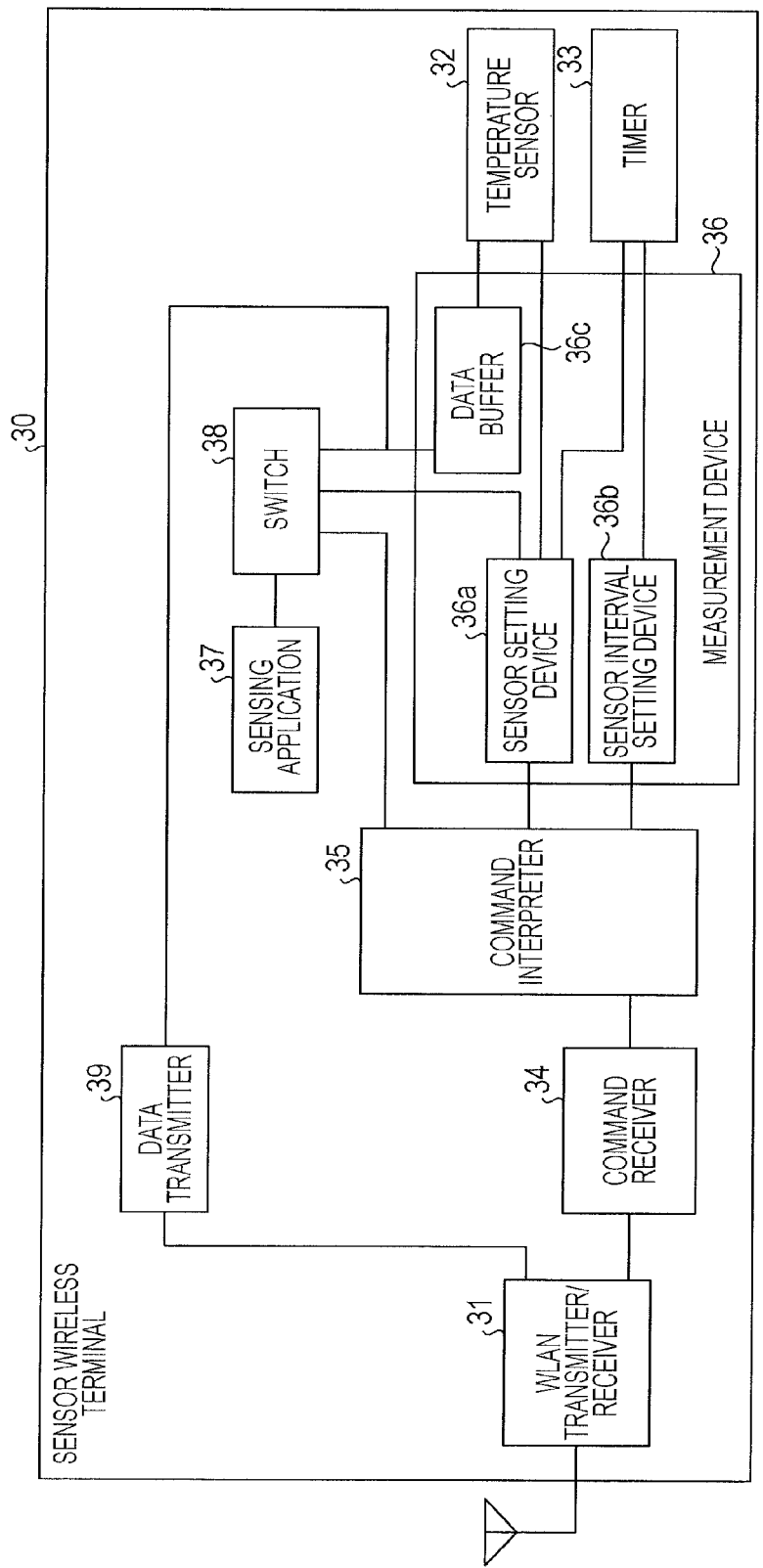
FIG. 4 is a block diagram illustrating a configuration of a sensor wireless terminal according to the first embodiment.

FIG. 4 is a block diagram illustrating a configuration of the sensor wireless terminal 30 according to the first embodiment. As illustrated in FIG. 4, the sensor wireless terminal 30 includes a WLAN transmitter/receiver 31, a temperature sensor 32, a timer 33, a command receiver 34, a command interpreter 35, a measurement device 36, a sensing application 37, a switch 38, and a data transmitter 39.

The WLAN transmitter/receiver 31 is a communication interface which connects the server 10 and a wireless communication to each other. For example, the WLAN transmitter/receiver 31 establishes a wireless communication using the Wi-Fi, for example, with the server 10 or another sensor wireless terminal and executes transmission and reception of data using the established communication.

The temperature sensor 32 serving as a sensing device detects a temperature all the time or at a predetermined interval to be stored in a data buffer 36c which will be described hereinafter. The timer 33 controls a sensing interval of the temperature sensor 32. The command receiver 34 receives a control command from the server 10 through the WLAN transmitter/receiver 31 and outputs the received control command to the command interpreter 35.

The command interpreter 35 analyzes the control command supplied from the command receiver 34 and instructs a controller to perform a process. In the example described above, it is assumed that the command receiver 34 receives the control command A representing "reference temperature data=temperature data SA of itself, control signal=enable signal, and extra acquisition interval=none".

In this case, the command interpreter 35 instructs the switch 38 to refer to the "sensor value of itself" in accordance with the information representing "the temperature data SA of it" extracted from the control command A. Furthermore, the command interpreter 35 outputs the "enable signal" extracted from the control command A to a sensor setting device 36a. Moreover, the command interpreter 35 outputs the information representing "extra acquisition interval=none" extracted from the control command A to a sensor interval setting device 36b.

Furthermore, it is assumed that the command receiver 34 receives the control command B representing "reference temperature data=temperature data SA of the other terminal, control signal=disable signal, and extra acquisition interval=5 seconds".

In this case, the command interpreter 35 instructs the switch 38 to refer to the "temperature data SA sensed by the sensor wireless terminal A" in accordance with the information representing "temperature data SA of the other terminal" extracted from the control command B. Furthermore, the command interpreter 35 outputs the "disable signal" extracted from the control command B to the sensor setting device 36a. Moreover, the command interpreter 35 outputs the information representing that "extra acquisition interval=5 seconds" extracted from the control command B to the sensor interval setting device 36b.

The measurement device 36 including the sensor setting device 36a, the sensor interval setting device 36b, and the data buffer 36c controls the temperature sensor 32 using the sensor setting device 36a, the sensor interval setting device 36b, and the data buffer 36c so as to detect a temperature. The sensor setting device 36a controls a state of the temperature sensor 32 in accordance with the information obtained from the command interpreter 35. For example, the sensor setting device 36a enables the temperature sensor 32 when receiving the "enable signal" from the command interpreter 35. On the other hand, the sensor setting device 36a disables the temperature sensor 32 for a period of time set in the timer 33 when receiving the "disable signal" from the command interpreter 35.

The sensor interval setting device 36b controls the timer 33 of the temperature sensor 32 in accordance with the information obtained from the command interpreter 35. For example, the sensor interval setting device 36b does not set the timer 33 when receiving the information representing "extra acquisition interval=none" from the command interpreter 35. Furthermore, the sensor interval setting device 36b sets 5 seconds to the timer 33 when receiving the information representing "extra acquisition interval=5 seconds" from the command interpreter 35.

The data buffer 36c serves as a storage device which stores data of temperatures sensed by the temperature sensor 32. The temperature data stored in the data buffer 36c is referenced by the sensing application 37 under control of the switch 38.

The sensing application 37 manages entire temperature sensing executed by the sensor wireless terminal 30. Specifically, when the sensing application 37 is executed, the measurement device 36, the temperature sensor 32, and the like operate to thereby execute the temperature sensing. Furthermore, the sensing application 37 reads the temperature data stored in the data buffer 36c and outputs the temperature data to the data transmitter 39 through the switch 38. Moreover, the sensing application 37 refers to temperature data of the other terminal obtained by the command interpreter 35 through the switch 38. In this case, the sensing application 37 inhibits the data transmitter 39 to output the temperature data.

The switch 38 switches a reference destination of the sensing application 37 in accordance with an instruction issued by the command interpreter 35. For example, when the command interpreter 35 instructs the switch 38 to refer to "temperature data of the other terminal", the switch 38 switches access from the sensing application 37 to the "temperature data of the other terminal" instead of the data buffer 36c. Note that the information representing "temperature data of the other terminal" is stored in a memory, an internal memory of the measurement device 36, or the like. On the other hand, when the command interpreter 35 instructs the switch 38 to refer to "temperature data of itself", the switch 38 switches access from the sensing application 37 to the data buffer 36c.

The data transmitter 39 transmits the temperature data obtained by the sensing application 37 from the data buffer 36c to the server 10 through the WLAN transmitter/receiver 31. In this case, the data transmitter 39 may add an ID which identifies the device itself to a packet including the temperature data to be transmitted.

Processing Flow

Next, a process executed by the system illustrated in FIG. 1 will be described with reference to FIGS. 5 to 8. Here, a process executed by the server 10, a process executed by the sensor wireless terminal 30, and a sequence of the system will be described.

Process Executed by Server

Figure 5:
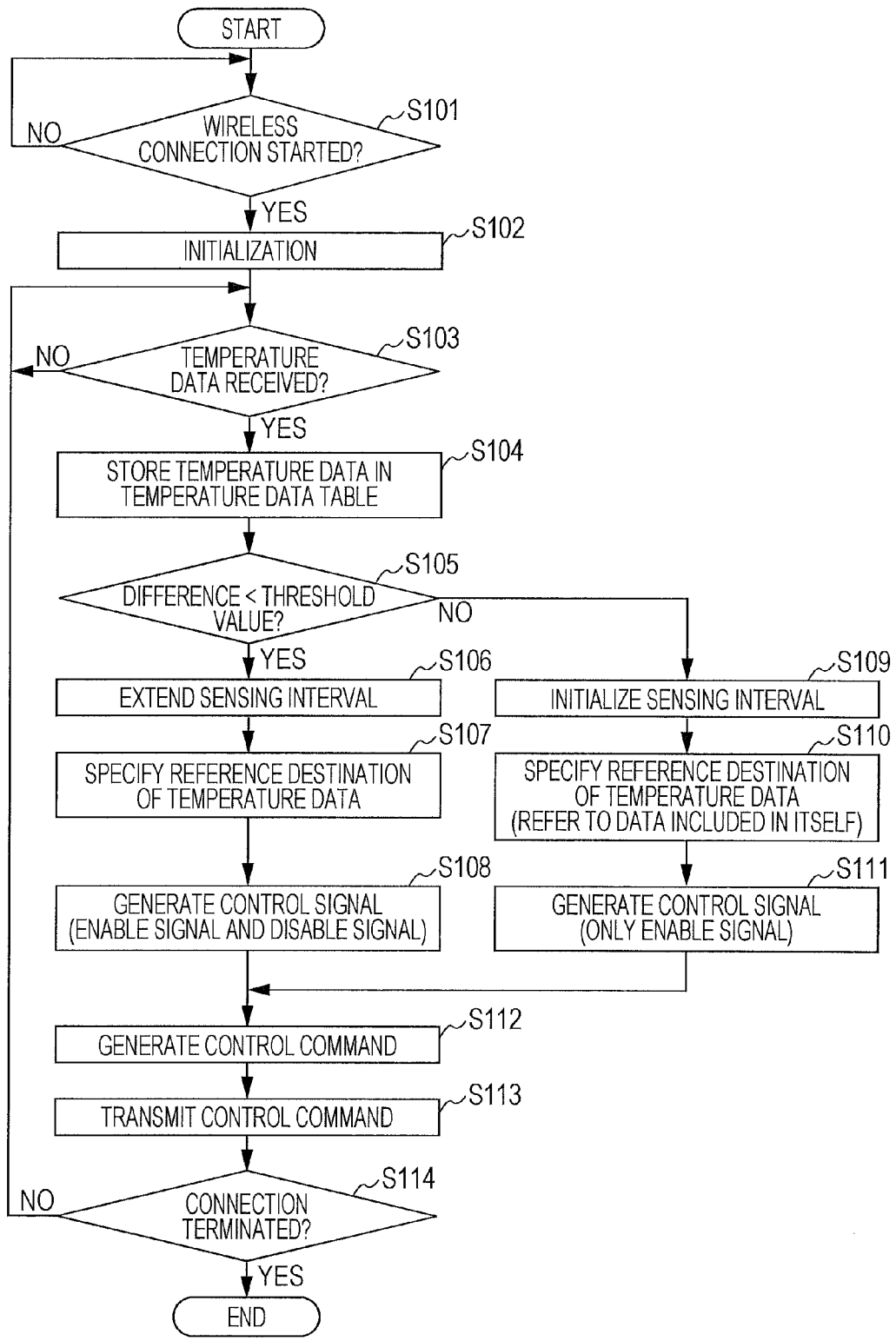
FIG. 5 is a flowchart illustrating a process executed by the server according to the first embodiment.

FIG. 5 is a flowchart illustrating a process executed by the server 10 according to the first embodiment. As illustrated in FIG. 5, when the WLAN transmitter/receiver 11 establishes a wireless communication with the sensor wireless terminals A and B (a determination is affirmative in step S101), the data receiver 13 initializes the temperature data table 12 (in step S102). Specifically, the data receiver 13 initializes the sensor control and the acquisition interval in the temperature data table 12.

Thereafter, when receiving the temperature data from the sensor wireless terminals A and B (a determination is affirmative in step S103), the data receiver 13 stores the received temperature data in the temperature data table 12 (in step S104) after associating the temperature data with IDs used to identify the terminals serving as transmission sources. Then the data comparator 14 compares the temperature data of the sensor wireless terminal A and the temperature data of the sensor wireless terminal B with each other with reference to the temperature data table 12 so as to determine whether a difference is smaller than a threshold value (in step S105).

When the difference between the temperature data of the sensor wireless terminals A and B is smaller than the threshold value (the determination is affirmative in step S105), the extra-interval determination device 17 determines that one of the sensor wireless terminals A and B performs normal sensing and the sensing interval for the other of the sensor wireless terminals A and B is extended (in step S106). In the example described above, the extra-interval determination device 17 determines "extra acquisition interval=none" for the sensor wireless terminal A whereas the extra-interval determination device 17 determines "extra acquisition interval=5 seconds" for the sensor wireless terminal B.

Subsequently, the reference data determination device 15 determines that the sensor wireless terminals A and B refer to the same temperature data (in step S107). In the example described above, the reference data determination device 15 determines that the sensor wireless terminal A obtains the sensor value of itself the sensor wireless terminal B obtains the sensor value obtained by the sensor wireless terminal A.

Thereafter, the control signal generator 16 generates a control signal representing whether each of the sensor wireless terminals A and B is to perform sensing (in step S108). In the example described above, the control signal generator 16 generates an "enable signal" for the sensor wireless terminal A and a "disable signal" for the sensor wireless terminal B.

On the other hand, when the difference between the temperature data of the sensor wireless terminal A and the temperature data of the sensor wireless terminal B is not smaller than the threshold value (the determination is negative in step S105), the extra-interval determination device 17 determines that the sensor wireless terminals A and B initialize the sensing intervals (in step S109).

Subsequently, the reference data determination device 15 determines that each of the sensor wireless terminals A and B refers to the temperature data sensed by itself (in step S110). Furthermore, the control signal generator 16 generates a control signal which causes the sensor wireless terminals A and B to execute normal sensing (in step S111). In the example described above, the control signal generator 16 generates an "enable signal" for the sensor wireless terminals A and B.

Note that step S106 to step S108 are replaceable with one another. Similarly, step S109 to step S111 are replaceable with one another.

Thereafter, the command generator 18 generates control commands for the sensor wireless terminals A and B in accordance with the information determined by the process from step S106 to step S108 or the information determined by the process from step S109 to step S111 (in step S112). Then the command transmitter 19 transmits the control commands generated by the command generator 18 to the sensor wireless terminals A and B through the WLAN transmitter/receiver 11 (in step S113).

Thereafter, when the wireless connection with the sensor wireless terminals A and B is disconnected and the communication is terminated (a determination is affirmative in step S114), the server 10 terminates the process. On the other hand, the wireless connection with the sensor wireless terminals A and B is continued (the determination is negative in step S114), the server 10 repeatedly performs the process from step S103 onwards.

Process Executed by Sensor Wireless Terminal

Figure 6:
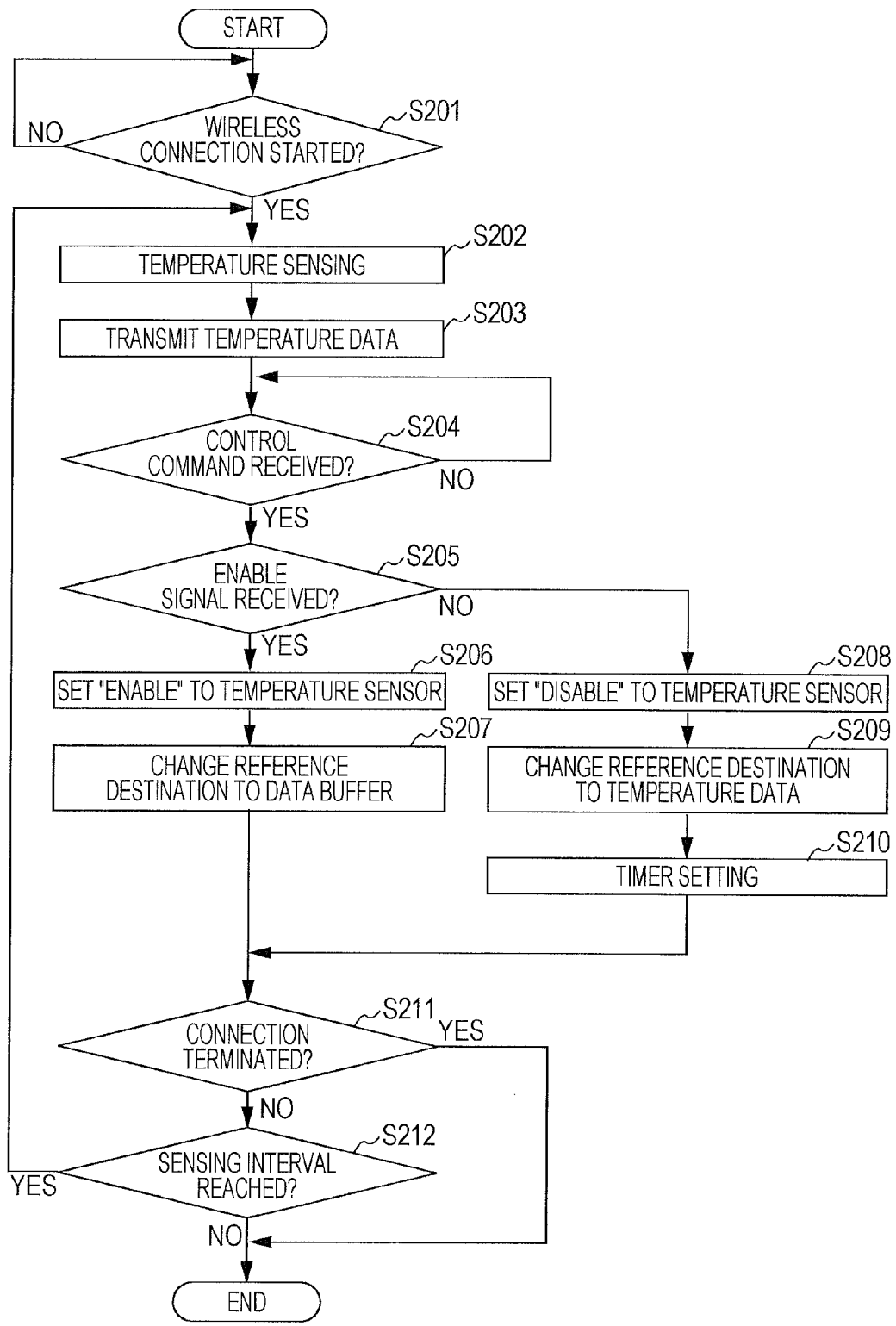
FIG. 6 is a flowchart illustrating a process executed by the sensor wireless terminal according to the first embodiment.

FIG. 6 is a flowchart illustrating a process executed by the sensor wireless terminal according to the first embodiment. As illustrated in FIG. 6, when the WLAN transmitter/receiver 31 establishes a wireless communication with the server 10 (a determination is affirmative in step S201), the sensing application 37 starts temperature sensing (in step S202). The data transmitter 39 transmits temperature data detected by the temperature sensor 32 to the server 10 through the WLAN transmitter/receiver 31 (in step S203).

Specifically, when the sensing application 37 executes the temperature sensing by operating the measurement device 36, the temperature sensor 32, and the like. Note that the temperature sensor 32 detects a temperature at a preset interval in an initial operation.

Thereafter, when the command receiver 34 receives a control command from the server 10 (a determination is affirmative in step S204), the command interpreter 35 determines whether a control signal included in the received control command is an "enable signal" (in step S205).

When the "enable signal" is received (the determination is affirmative in step S205), the sensor setting device 36a sets the "enable signal" extracted from the control command by the command interpreter 35 to the temperature sensor 32 and enables the temperature sensor 32 (in step S206). Subsequently, the sensor interval setting device 36b controls the switch 38 such that a reference destination of the sensing application 37 corresponds to the data buffer 36c in accordance with "reference destination temperature data" extracted by the command interpreter 35 from the control command (in step S207).

On the other hand, when a "disable signal" is received instead of the "enable signal" (the determination is negative in step S205), the "disable signal" extracted by the command interpreter 35 from the control command is set to the temperature sensor 32 (in step S208). As a result, the temperature sensor 32 stops the sensing for a period of time set in the timer 33. Subsequently, the sensor interval setting device 36b controls the switch 38 such that the reference destination of the sensing application 37 corresponds to the "temperature data of the other device" obtained from the server 10 in accordance with "reference destination temperature data" extracted by the command interpreter 35 from the control command (in step S209). Furthermore, the sensor interval setting device 36b sets an extra time to the timer 33 in accordance with the "extra acquisition interval" extracted by the command interpreter 35 from the control command (in step S210).

Thereafter, when the wireless connection with the server 10 is disconnected (a determination is affirmative in step S211), the sensor wireless terminal 30 terminates the sensing of temperature data. On the other hand, the wireless communication with the server 10 is continued (the determination is negative in step S211), the sensing application 37 of the sensor wireless terminal 30 determines whether the sensing interval has been reached (in step S212).

When the sensing interval has been reached (the determination is affirmative in step S212), the sensing application 37 executes a process from step S202 onwards. For example, when the process from step S206 to step S207 is performed, the sensing application 37 obtains temperature data after a prescribed initial interval such as an interval of 5 seconds is elapsed and transmits the temperature data to the server 10. On the other hand, when the process from step S208 to step S210 is performed, the sensing application 37 obtains temperature data after the initial interval plus an extra time is elapsed, for example, and transmits the temperature data to the server 10.

Processing Sequence

Figure 7A:
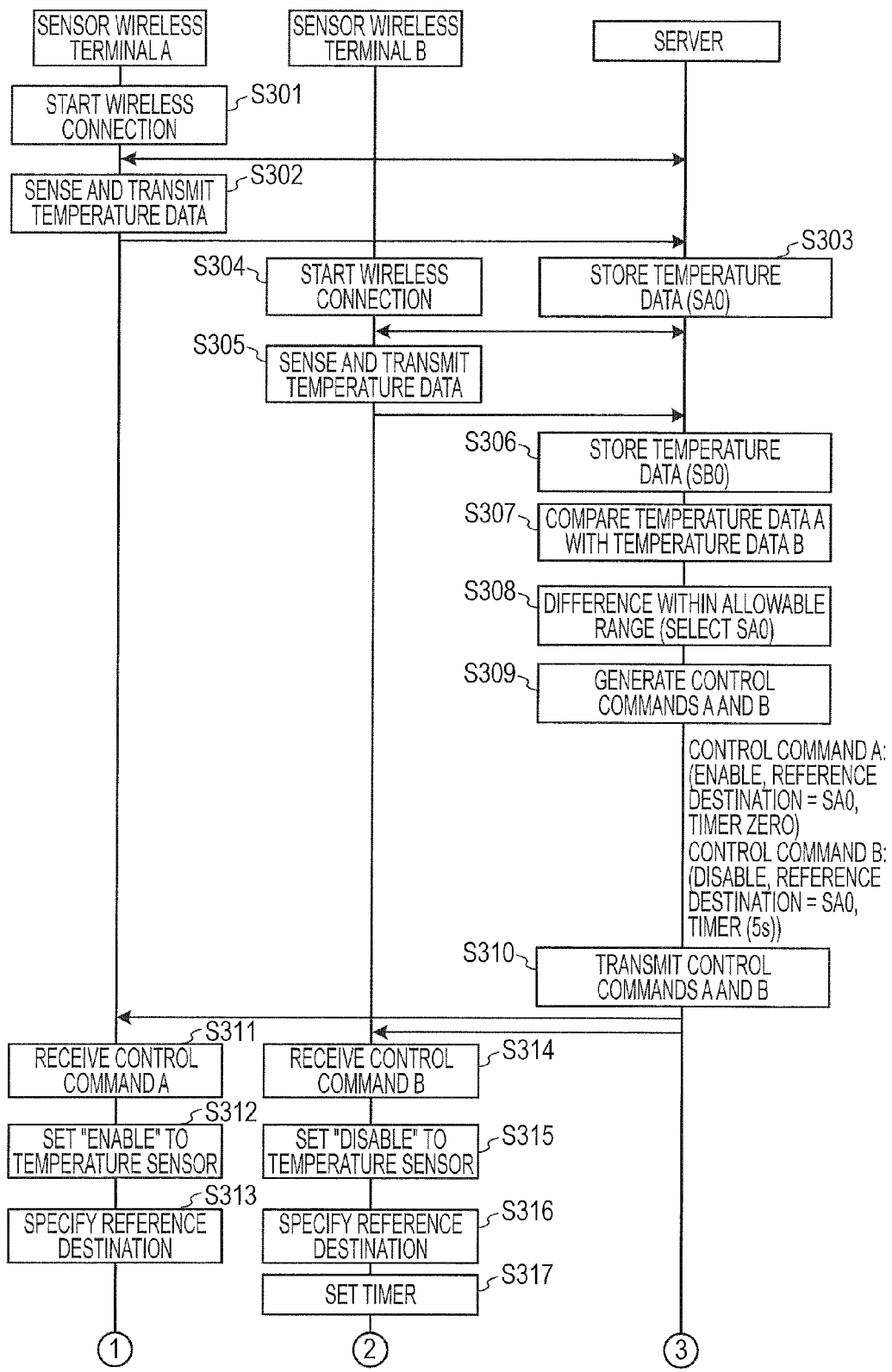
FIG. 7A is a sequence diagram illustrating a process executed by the system according to the first embodiment.
Figure 7B:
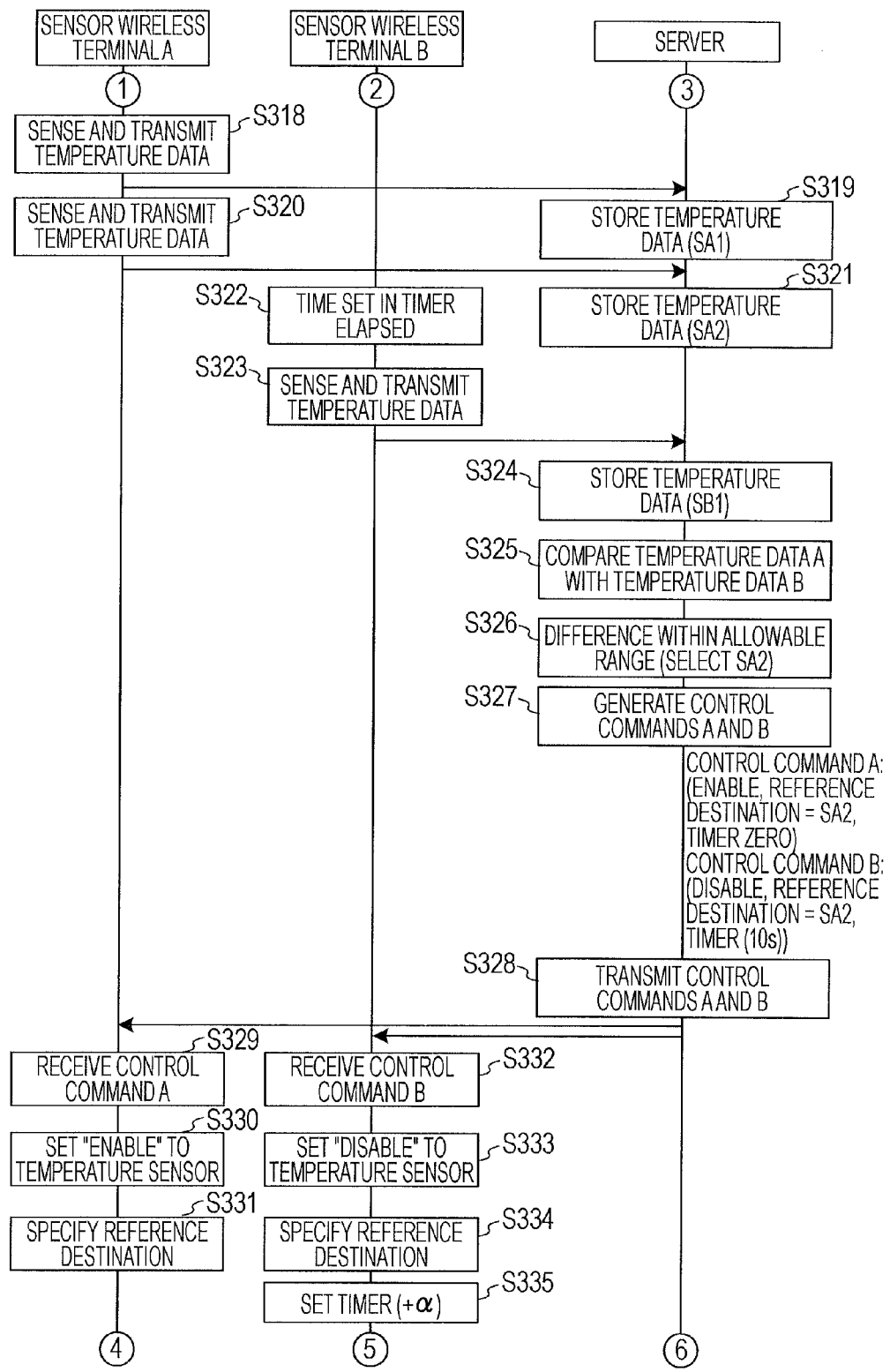
FIG. 7B is a sequence diagram illustrating the process executed by the system according to the first embodiment.

FIGS. 7A and 7B and FIG. 7C are sequence diagrams illustrating a flow of a process executed by the system according to the first embodiment. Note that the process illustrated in FIGS. 7A and 7B and FIG. 7C is merely an example and does not limit the processing flow.

As illustrated in FIG. 7, the WLAN transmitter/receiver 31 included in the sensor wireless terminal A accepts an instruction operation performed by the user or the like and establishes a wireless communication with the server 10 (in step S301). Then the sensing application 37 activates the measurement device 36, the temperature sensor 32, and the like so as to obtain temperature data "SA0", and the data transmitter 39 transmits the temperature data "SA0" to the server 10 (in step S302). The data receiver 13 included in the server 10 receives the temperature data "SA0" from the sensor wireless terminal A through the WLAN transmitter/receiver 11 and stores the temperature data "SA0" in the temperature data table 12 (in step S303).

Similarly, the WLAN transmitter/receiver 31 included in the sensor wireless terminal B accepts an instruction operation performed by the user or the like and establishes a wireless communication with the server 10 (in step S304). Then the sensing application 37 activates the measurement device 36, the temperature sensor 32, and the like so as to obtain temperature data "SB0", and the data transmitter 39 transmits the temperature data "SB0" to the server 10 (in step S305). The data receiver 13 included in the server 10 receives the temperature data "SB0" from the sensor wireless terminal B through the WLAN transmitter/receiver 11 and stores the temperature data "SB0" in the temperature data table 12 (in step S306).

Thereafter, the data comparator 14 included in the server 10 compares the temperature data "SA0" and the temperature data "SB0" with each other (in step S307) and determines that a difference is smaller than a threshold value, that is, the difference is within an allowable range (in step S308). Here, the data comparator 14 selects the temperature data "SA0" as main data.

Subsequently, the command generator 18 included in the server 10 generates control commands A and B in accordance with results output from the reference data determination device 15, the control signal generator 16, and the extra-interval determination device 17 (in step S309). Specifically, the command generator 18 generates a control command A including information representing "control signal=enable signal, reference destination=SA0, and extra acquisition interval=timer zero". Furthermore, the command generator 18 generates a control command B including information representing "control signal=disable signal, reference destination=SA0, and extra acquisition interval=timer (5 sec)".

Then the command transmitter 19 transmits the control commands A and B to the sensor wireless terminals A and B, respectively, through the WLAN transmitter/receiver 11 (in step S310).

In the sensor wireless terminal A, the command receiver 34 receives the control command A from the server 10 through the WLAN transmitter/receiver 31 (in step S311). The sensor wireless terminal A executes a process in step S312 and step S313 in accordance with a result of an interpretation of the control command A performed by the command interpreter 35.

Specifically, the sensor setting device 36a sets the enable signal to the temperature sensor 32 so as to enable the temperature sensor 32 (in step S312). Furthermore, the command interpreter 35 sets the data buffer 36c as a switching destination of the switch 38 since the received "reference destination" indicates the temperature data "SA0" of itself (in step S313).

In the sensor wireless terminal B, the command receiver 34 receives the control command B from the server 10 through the WLAN transmitter/receiver 31 (in step S314). The sensor wireless terminal B executes a process from step S315 to step S317 in accordance with a result of an interpretation of the control command B performed by the command interpreter 35.

Specifically, the sensor setting device 36a sets the disable signal to the temperature sensor 32 so as to disable the temperature sensor 32 (in step S315). Furthermore, the command interpreter 35 sets the received temperature data "SA0" as a switching destination of the switch 38 since the received "reference destination" indicates the temperature data of the other terminal (in step S316). Moreover, the sensor interval setting device 36b sets a timer value "5 sec" to the timer 33 in accordance with the information "extra acquisition interval=timer (5 sec)" (in step S317).

Thereafter, the sensor wireless terminal A executes temperature sensing at a preset initial interval. Specifically, the temperature sensor 32 detects temperature data "SA1" after the preset initial interval and the data transmitter 39 transmits the detected temperature data "SA1" to the server 10 through the WLAN transmitter/receiver 31 (in step S318). The data receiver 13 included in the server 10 receives the temperature data "SA1" from the sensor wireless terminal A through the WLAN transmitter/receiver 11 and stores the temperature data "SA1" in the temperature data table 12 (in step S319).

Furthermore, the temperature sensor 32 detects temperature data "SA2" after the preset initial interval and the data transmitter 39 transmits the detected temperature data "SA2" to the server 10 through the WLAN transmitter/receiver 31 (in step S320). The data receiver 13 included in the server 10 receives the temperature data "SA2" from the sensor wireless terminal A through the WLAN transmitter/receiver 11 and stores the temperature data "SA2" in the temperature data table 12 (in step S321).

Thereafter, the sensor wireless terminal B executes temperature sensing after a period of time obtained by adding the timer setting value to the preset initial interval (in step S322). Specifically, the temperature sensor 32 detects temperature data "SB1" after the period of time obtained by adding the timer setting value to the preset initial interval and the data transmitter 39 transmits the detected temperature data "SB1" to the server 10 through the WLAN transmitter/receiver 31 (in step S323). The data receiver 13 included in the server 10 receives the temperature data "SB1" from the sensor wireless terminal B through the WLAN transmitter/receiver 11 and stores the temperature data "SB1" in the temperature data table 12 (in step S324).

Thereafter, the data comparator 14 included in the server 10 compares the temperature data "SA2" and the temperature data "SB1" with each other (in step S325) and determines that a difference is smaller than a threshold value, that is, the difference is within an allowable range (in step S326). Here, the data comparator 14 selects the temperature data "SA2" as main data. Note that the data comparator 14 determines a comparison target using time stamps of temperature data received from the terminals A and B.

Subsequently, the command generator 18 included in the server 10 generates control commands A and B in accordance with results output from the reference data determination device 15, the control signal generator 16, and the extra-interval determination device 17 (in step S327). Here, the extra-interval determination device 17 specifies an extra time which is longer than a period of time which has been extended before since a difference between the temperature data is consecutively smaller than the threshold value. Specifically, the command generator 18 generates a control command A including information representing "control signal=enable signal, reference destination=SA2, and extra acquisition interval=timer zero". Furthermore, the command generator 18 generates a control command B including information representing "control signal=disable signal, reference destination=SA2, and extra acquisition interval=timer (5 sec×2=10 sec)".

Then the command transmitter 19 included in the server 10 transmits the control commands A and B to the sensor wireless terminals A and B, respectively, through the WLAN transmitter/receiver 11 (in step S328).

In the sensor wireless terminal A, the command receiver 34 receives the control command A from the server 10 through the WLAN transmitter/receiver 31 (in step S329). The sensor wireless terminal A executes a process in step S330 and step S331 in accordance with a result of an interpretation of the control command A performed by the command interpreter 35.

Specifically, the sensor setting device 36a sets the enable signal to the temperature sensor 32 so as to enable the temperature sensor 32 (in step S330). Furthermore, the command interpreter 35 sets the data buffer 36c as a switching destination of the switch 38 since the received "reference destination" indicates the temperature data "SA2" of itself (in step S331).

In the sensor wireless terminal B, the command receiver 34 receives the control command B from the server 10 through the WLAN transmitter/receiver 31 (in step S332). The sensor wireless terminal B executes a process from step S333 to step S335 in accordance with a result of an interpretation of the control command B performed by the command interpreter 35.

Specifically, the sensor setting device 36a sets the disable signal to the temperature sensor 32 so as to disable the temperature sensor 32 (in step S333). Furthermore, the command interpreter 35 sets the received temperature data "SA2" as a switching destination of the switch 38 since the received "reference destination" indicates the temperature data "SA2" of the other terminal (in step S334). Moreover, the sensor interval setting device 36b sets a timer value "10 sec" to the timer 33 in accordance with the information "extra acquisition interval=timer (10 sec)" (in step S335).

Thereafter, the sensor wireless terminal A executes temperature sensing after the preset initial interval. Specifically, the temperature sensor 32 detects temperature data "SA3" after the preset initial interval and the data transmitter 39 transmits the detected temperature data "SA3" to the server 10 through the WLAN transmitter/receiver 31 (in step S336). The data receiver 13 included in the server 10 receives the temperature data "SA3" from the sensor wireless terminal A through the WLAN transmitter/receiver 11 and stores the temperature data "SA3" in the temperature data table 12 (in step S337).

Furthermore, the temperature sensor 32 detects temperature data "SA4" after the preset initial interval and the data transmitter 39 transmits the detected temperature data "SA4" to the server 10 through the WLAN transmitter/receiver 31 (in step S338). The data receiver 13 included in the server 10 receives the temperature data "SA4" from the sensor wireless terminal A through the WLAN transmitter/receiver 11 and stores the temperature data "SA4" in the temperature data table 12 (in step S339).

Thereafter, the sensor wireless terminal B executes temperature sensing after a period of time obtained by adding the timer setting value to the preset initial interval (in step S340). Specifically, the temperature sensor 32 detects temperature data "SB2" after the period of time obtained by adding the timer setting value to the preset initial interval and the data transmitter 39 transmits the detected temperature data "SB2" to the server 10 through the WLAN transmitter/receiver 31 (in step S341). The data receiver 13 included in the server 10 receives the temperature data "SB2" from the sensor wireless terminal B through the WLAN transmitter/receiver 11 and stores the temperature data "SB2" in the temperature data table 12 (in step S342).

Thereafter, the data comparator 14 included in the server 10 compares the temperature data "SA4" and the temperature data "SB2" with each other (in step S343) and determines that a difference is not smaller than a threshold value, that is, the difference is out of the allowable range (in step S344). Note that the data comparator 14 determines a comparison target using time stamps of temperature data received from the terminals A and B.

Subsequently, the command generator 18 included in the server 10 generates control commands A and B in accordance with results output from the reference data determination device 15, the control signal generator 16, and the extra-interval determination device 17 (in step S345). Specifically, the command generator 18 generates a control command A including information representing "control signal=enable signal, reference destination=SA4, and extra acquisition interval=timer zero". Furthermore, the command generator 18 generates a control command B including information representing "control signal=enable signal, reference destination=SB2, and extra acquisition interval=timer zero".

Then the command transmitter 19 transmits the control commands A and B to the sensor wireless terminals A and B, respectively, through the WLAN transmitter/receiver 11 (in step S346).

In the sensor wireless terminal A, the command receiver 34 receives the control command A from the server 10 through the WLAN transmitter/receiver 31 (in step S347). The sensor wireless terminal A executes a process in step S348 and step S349 in accordance with a result of an interpretation of the control command A performed by the command interpreter 35.

Specifically, the sensor setting device 36a sets the enable signal to the temperature sensor 32 so as to enable the temperature sensor 32 (in step S348). Furthermore, the command interpreter 35 sets the data buffer 36c as a switching destination of the switch 38 since the received "reference destination" indicates the temperature data "SA4" of itself (in step S349).

In the sensor wireless terminal B, the command receiver 34 receives the control command B from the server 10 through the WLAN transmitter/receiver 31 (in step S350). The sensor wireless terminal B executes a process from step S351 to step S353 in accordance with a result of an interpretation of the control command B performed by the command interpreter 35.

Specifically, the sensor setting device 36a sets the enable signal to the temperature sensor 32 so as to enable the temperature sensor 32 (in step S351). Furthermore, the command interpreter 35 sets the data buffer 36c as a switching destination of the switch 38 since the received "reference destination" indicates the temperature data "SB2" of itself (in step S352). Moreover, the sensor interval setting device 36b initializes the timer value of the timer 33 in accordance with the information "extra acquisition interval=timer zero" (in step S353). Thereafter, while the server 10 and the sensor wireless terminals A and B are connected to each other by the wireless communication, the process from step S301 to step S353 described above is repeatedly performed.

Advantages of First Embodiment

As described above, the sensor wireless terminals A and B execute the temperature sensing in accordance with extra times (timer) supplied from the server 10 and supplies results of the sensing to the server 10. When a difference between the temperature data of the sensor wireless terminals A and B is smaller than the threshold value, the server 10 instructs one of the sensor wireless terminals A and B to perform the temperature sensing and instructs the other of the sensor wireless terminals A and B to interrupt the temperature sensing for a predetermined period of time. As a result, power consumed when the temperature sensing is performed by one of the sensor wireless terminals A and B may be reduced, and therefore, power consumption of the sensor wireless terminals A and B may be suppressed and reduction of power consumption may be realized in a unit of a terminal group. Accordingly, electric power saving is realized with a high degree which is not realized by a single terminal.

Second Embodiment

In the first embodiment, the server 10 receives sensing data from the sensor wireless terminals A and B and controls the sensing intervals. However, the embodiment is not limited to this. For example, the server 10 may receive usage states of the sensor wireless terminals A and B so as to control the sensing intervals.

In a second embodiment, as an example of a server 10 which receives usage states of sensor wireless terminals so as to control sensing intervals, the server 10 obtains usage information representing as to whether a user which has sensor wireless terminals is on a train. Therefore, in the second embodiment, the sensor wireless terminals include acceleration sensors. Furthermore, the server 10 includes a usage information table which stores usage information received from the sensor wireless terminals.

Figure 8:
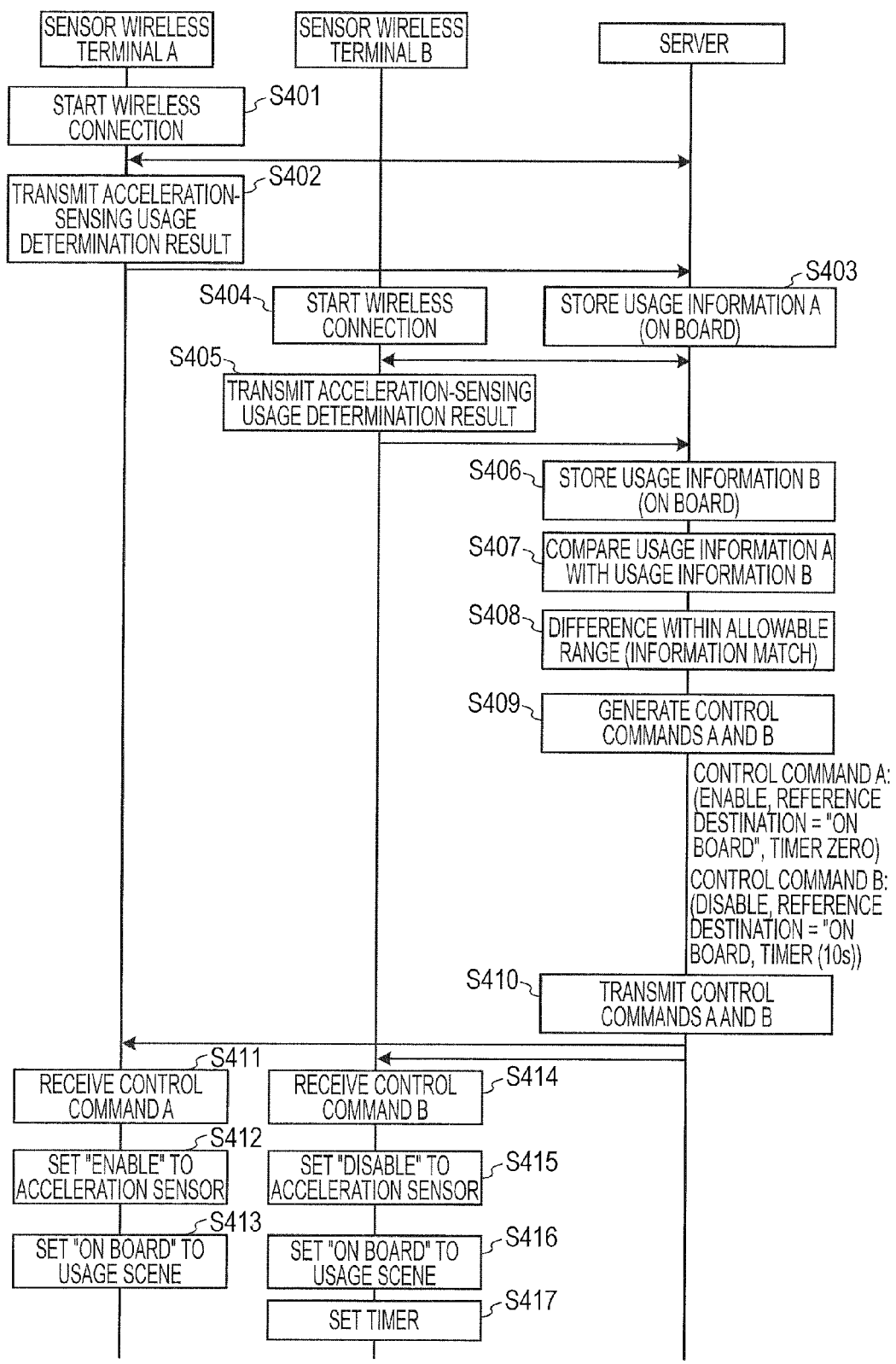
FIG. 8 is a sequence diagram illustrating a process executed by a system according to a second embodiment.

FIG. 8 is a sequence diagram illustrating a process executed by the system according to the second embodiment. When a WLAN transmitter/receiver 31 included in a sensor wireless terminal A accepts an instruction operation performed by a user or the like and establishes a wireless communication with the server 10 (in step S401).

Then a sensing application 37 activates a measurement device 36, an acceleration sensor, and the like so as to obtain an acceleration rate, and a data transmitter 39 transmits usage information A determined in accordance with the acceleration rate to the server 10 (in step S402). For example, when the obtained acceleration rate is equal to or larger than a predetermined value, the sensing application 37 determines that a user who has the sensor wireless terminal A is on a train or the like. The data transmitter 39 transmits information representing "on board" to the server 10 as usage information A. Note that, when the obtained acceleration rate is smaller than the predetermined value, the sensing application 37 determines that the user who has the sensor wireless terminal A is not on a train or the like. In this case, the data transmitter 39 transmits information representing "not on board" to the server 10 as the usage information A.

The data receiver 13 included in the server 10 receives the usage information A "on board" from the sensor wireless terminal A through a WLAN transmitter/receiver 11 and stores the usage information "on board" in the usage information table (in step S403).

Similarly, the WLAN transmitter/receiver 31 included in the sensor wireless terminal B accepts an instruction operation performed by the user or the like and establishes a wireless communication with the server 10 (in step S404). Then the sensing application 37 activates the measurement device 36, the acceleration sensor, and the like so as to obtain an acceleration rate, and the data transmitter 39 transmits usage information B "on board" determined in accordance with the acceleration rate to the server 10 (in step S405).

The data receiver 13 included in the server 10 receives the usage information B "on board" from the sensor wireless terminal B through the WLAN transmitter/receiver 11 and stores the usage information B "on board" in the usage information table (in step S406).

Thereafter, a data comparator 14 included in the server 10 compares the usage information A "on board" and the usage information B "on board" with each other (in step S407) and determines that the usage information A and the usage information B match each other (in step S408). In this case, the data comparator 14 selects the usage information A "on board" as main data.

Subsequently, a command generator 18 included in the server 10 generates control commands A and B in accordance with results output from a reference data determination device 15, a control signal generator 16, and an extra-interval determination device 17 (in step S409). Specifically, the command generator 18 generates a control command A including information representing "control signal=enable signal, reference destination=usage information A "on board", and extra acquisition interval=timer zero". Furthermore, the command generator 18 generates a control command B including information representing "control signal=disable signal, reference destination=usage information A "on board", and extra acquisition interval=timer (10 sec)".

Then the command transmitter 19 included in the server 10 transmits the control commands A and B to the sensor wireless terminals A and B, respectively, through the WLAN transmitter/receiver 11 (in step S410).

In the sensor wireless terminal A, a command receiver 34 receives the control command A from the server 10 through the WLAN transmitter/receiver 31 (in step S411). The sensor wireless terminal A executes a process in step S412 and step S413 in accordance with a result of an interpretation of the control command A performed by a command interpreter 35.

Specifically, a sensor setting device 36a sets the enable signal to the acceleration sensor so as to enable the acceleration sensor (in step S412). Furthermore, the command interpreter 35 sets the information representing "on board" as a usage scene in accordance with the obtained "usage information A "on board"" (in step S413). Specifically, the command interpreter 35 sets a data buffer 36c as a switching destination of the switch 38.

In the sensor wireless terminal B, the command receiver 31 receives the control command B from the server 10 through the WLAN transmitter/receiver 31 (in step S414). The sensor wireless terminal B executes a process from step S415 to step S417 in accordance with a result of an interpretation of the control command B performed by the command interpreter 35.

Specifically, a sensor setting device 36a sets the disable signal to the acceleration sensor so as to disable the acceleration sensor (in step S415). Furthermore, the command interpreter 35 sets the information representing "on board" as a usage scene in accordance with the obtained "usage information A "on board"" (in step S416). Specifically, the command interpreter 35 sets the received data as a switching destination of the switch 38 instead of the data buffer 36c. Moreover, the sensor interval setting device 36b sets a timer value "10 sec" to the timer 33 in accordance with the information "extra acquisition interval=timer (10 sec)" (in step S417).

As described above, the server 10 may control not only the sensing data but also the sensing interval using the information determined by the sensing data. Accordingly, a method for controlling the sensing interval performed by the server 10 may be utilized in various fields.

Third Embodiment

Although the embodiments of the present disclosure have been described hereinabove, various modifications of the foregoing embodiments may be made. Therefore, other embodiments will be described hereinafter.

Grouping According to Electric Wave Intensity

For example, a server 10 may group sensor wireless terminals which are in the same space, that is, which use the same access point according to electric wave intensity and thereafter may perform the processes in the first and second embodiments for each group.

Figure 9:
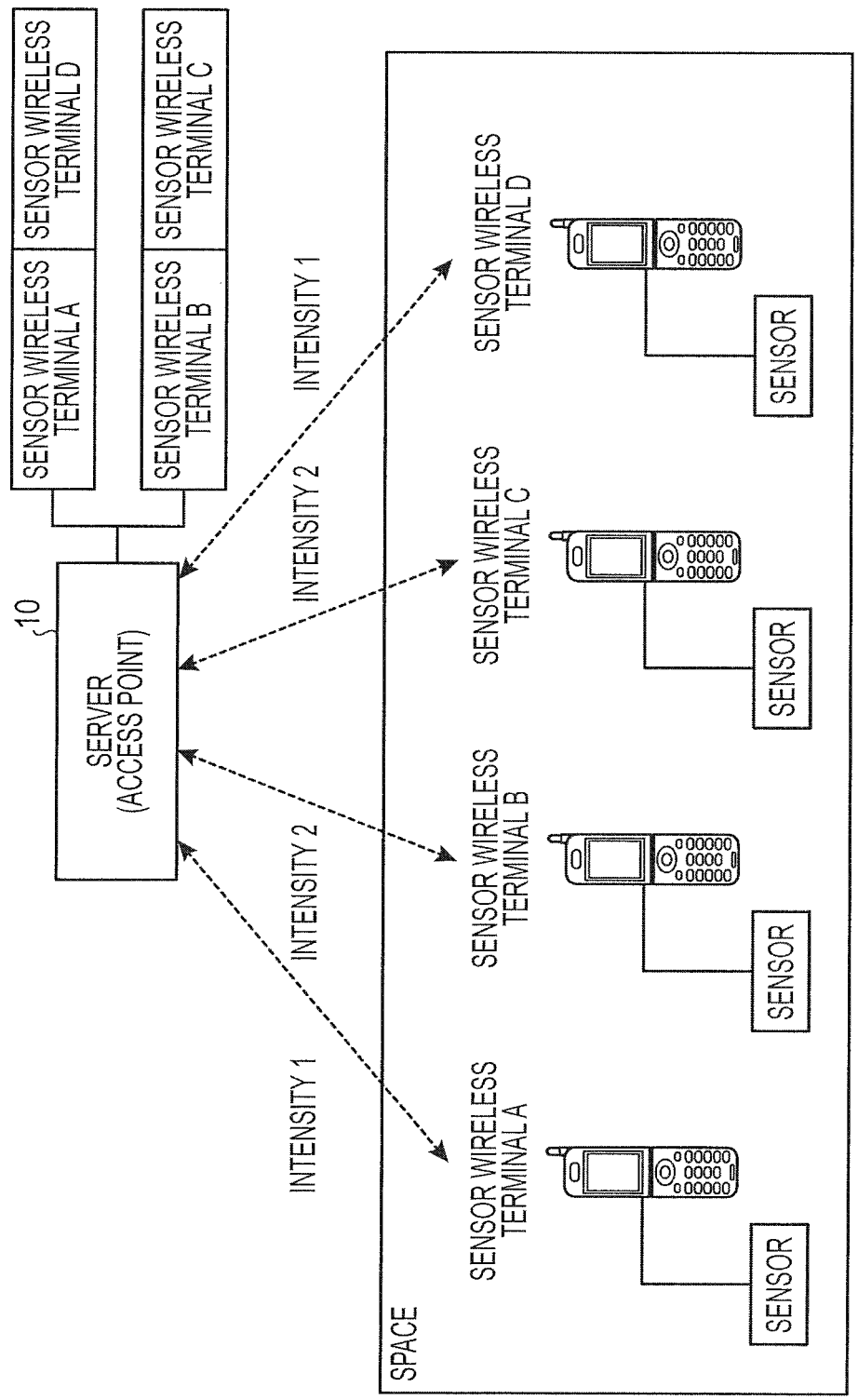
FIG. 9 is a diagram illustrating grouping.

FIG. 9 is a diagram illustrating the grouping. As illustrated in FIG. 9, the server 10 is connected to sensor wireless terminals A to D via a wireless communication. The sensor wireless terminals A to D are included in the same space.

When establishing the wireless communication with the sensor wireless terminals A to D, the server 10 measures intensities of electric waves of the wireless communication transmitted by the sensor wireless terminals A to D. Note that the measurement of the electric wave intensities may be performed using a general technique, and therefore, detailed description thereof is omitted.

For example, the server 10 determines that the sensor wireless terminal A transmits an electric wave having an intensity of "intensity level 1", the sensor wireless terminal B transmits an electric wave having an intensity of "intensity level 2", the sensor wireless terminal C transmits an electric wave having an intensity of "intensity level 2", and the sensor wireless terminal D transmits an electric wave having an intensity of "intensity level 1".

Thereafter, the server 10 makes a group including the sensor wireless terminals A and D which have the electric wave intensity of "intensity level 1" and a group including the sensor wireless terminals B and C which have the electric wave intensity of "intensity level 2". The server 10 may execute the processes of the first and second embodiments for each group.

In this way, even when sensor wireless terminals are located in a large space, the server 10 divides the space into a plurality of regions by performing the grouping according to electric wave intensities. When similar values are sensed in each of the regions, the server 10 may realize power saving of the terminals other than at least one terminal. Note that, as for the grouping according to the electric wave intensities, not only the grouping performed by grouping terminals having the same electric wave intensity but also grouping performed by grouping terminals having electric wave intensities within a predetermined range may be employed.

Grouping According to Access Point

Although the case where the server 10 has a function of an access point has been described in the first embodiment, the embodiment is not limited to this and the server 10 and the access point may be separately provided.

Figure 10:
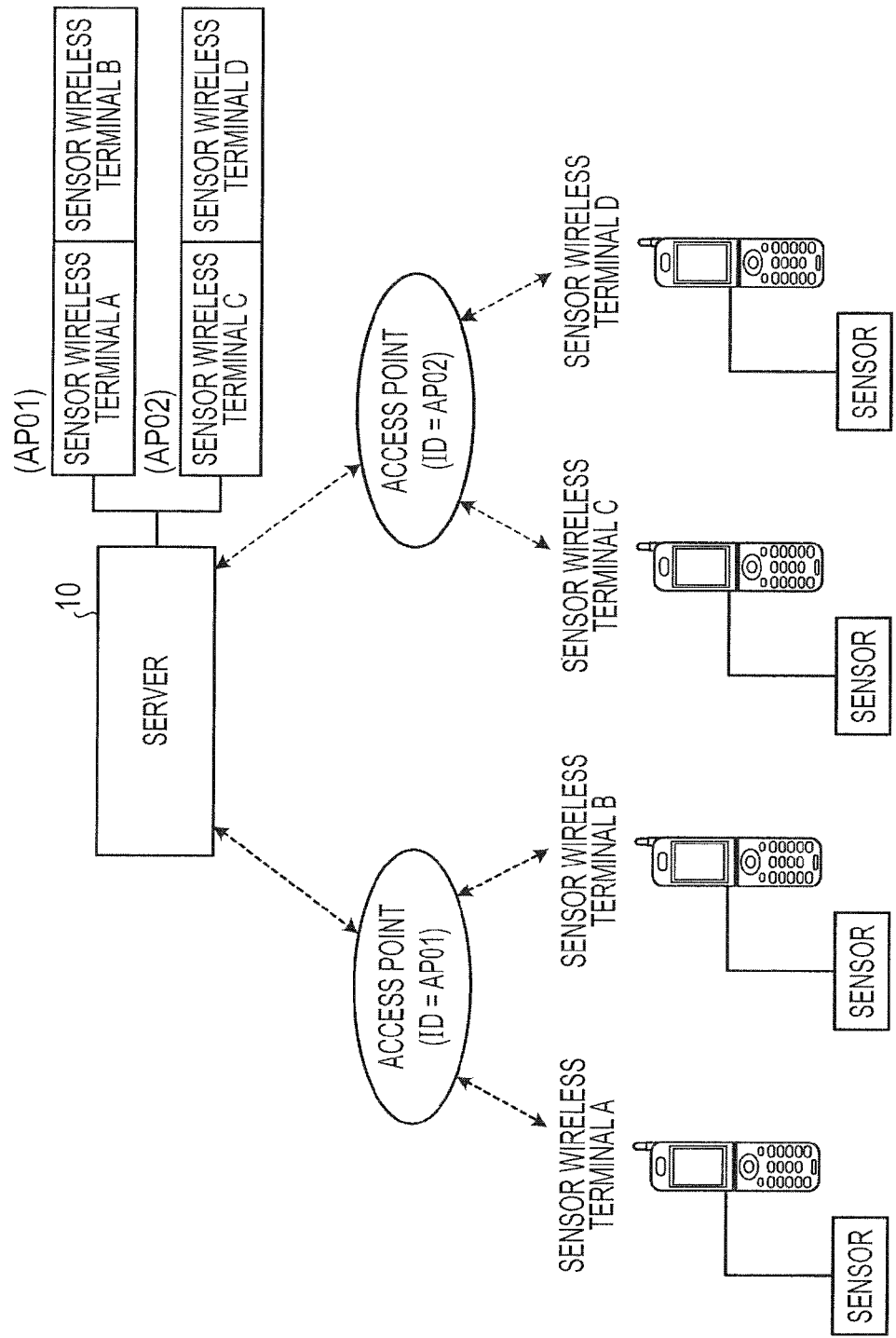
FIG. 10 is a diagram illustrating grouping according to access points.

FIG. 10 is a diagram illustrating grouping according to access points. As illustrated in FIG. 10, the server 10 is connected to sensor wireless terminals A to D via a wireless communication. Furthermore, the sensor wireless terminals A and B are managed by an access point having an ID of AP01. The sensor wireless terminals C and D are managed by an access point having an ID of AP02. The server 10 is connected to the access points.

The server 10 may execute the processes of the first and second embodiments for each access point. Specifically, the server 10 performs the processes of the first and second embodiments on a first group including the sensor wireless terminals A and B and a second group including the sensor wireless terminals C and D.

By this, processes the same as those of the first and second embodiments may be executed without adding a function to the existing access points. Furthermore, since the server 10 may manage a plurality of access points, reduction of cost and reduction of power consumption may be attained when compared with a case where a plurality of servers 10 are provided for a plurality of access points.

Communication Method

In the foregoing embodiments, the server 10 receives a sensing value from the sensor wireless terminals or the access points through a wireless communication, for example. However, the embodiments are not limited to these. For example, the server 10 and sensor wireless terminals or access points may be connected to one another in a wired manner. Furthermore, the server 10 may receive sensor values of the sensor wireless terminals input by an administrator. In this case, the server 10 executes the processes in the first embodiment in accordance with the sensor values input by the administrator and displays information on generated control commands in a display or the like. Then advantages similar to those of the first embodiment may be obtained by executing commands input by the administrator to the sensor wireless terminals.

The Number of Sensor Wireless Terminals

For example, in the foregoing embodiments, the case where the two sensor wireless terminals are used has been described. However, the embodiments are not limited to this and three or more sensor wireless terminals may be used. When three or more sensor wireless terminals are used, processes similar to those of the second embodiment may be executed by performing a determination as to whether an average or a standard deviation of sensor values obtained from the terminals is smaller than a threshold value by the server 10. Furthermore, processes similar to those of the second embodiment may be executed by performing calculations of differences of the sensor values of the terminals and performing a determination as to whether a sum of the differences is smaller than a threshold value.

Control of Interval

In the foregoing embodiments, the case where the server 10 extends the sensing interval of the sensor wireless terminals, that is, an interval of detection of temperature data performed by the temperature sensor has been described. However, the embodiments are not limited to this. For example, the server 10 may extend an interval of transmission of a sensor value from a sensor wireless terminal to the server 10.

In the foregoing embodiments, in the sensor wireless terminals, when the temperature sensor or the like obtains a sensor value, the sensor value is transmitted to the server 10. However, an interval of the transmission of the sensor value to the server 10 may be extended. Consequently, power consumption of the transmission of the sensor value may be suppressed instead of power consumption of the sensor. Furthermore, control of an acquisition interval and control of a transmission interval may be performed in combination. In this case, both of the power consumption of the sensor and the power consumption of the transmission of the sensor value may be suppressed.

System

Furthermore, in the processes described in the foregoing embodiments, all or some of processes which are automatically executed may be manually performed. Alternatively, all or some of processes which are manually executed may be automatically performed using a general method. Furthermore, the processing procedures, the control procedures, the concrete names, and the information including various data illustrated in FIG. 3 and parameters which are described in the specification and illustrated in the drawings may be arbitrarily changed unless otherwise specified.

Moreover, the illustrated components included in the devices are conceptual functions and may not be physically configured as illustrated in the drawings. Specifically, a detailed configuration of distribution and integration of the devices is not limited to those illustrated in the drawings. That is, all or some of the devices may be functionally or physically distributed or integrated in an arbitrary unit depending on various loads or usage states. Furthermore, all or some of the processing functions performed by the devices may be realized by a CPU or programs which are analyzed and executed by the CPU or may be realized as hardware using a wired logic.

Program

The various processes described in the foregoing embodiments may be realized by executing programs which are provided in advance using a computer system such as a personal computer or a work station. Therefore, an example of a computer system which executes programs having functions the same as the functions of the foregoing embodiments will be described.

Figure 11:
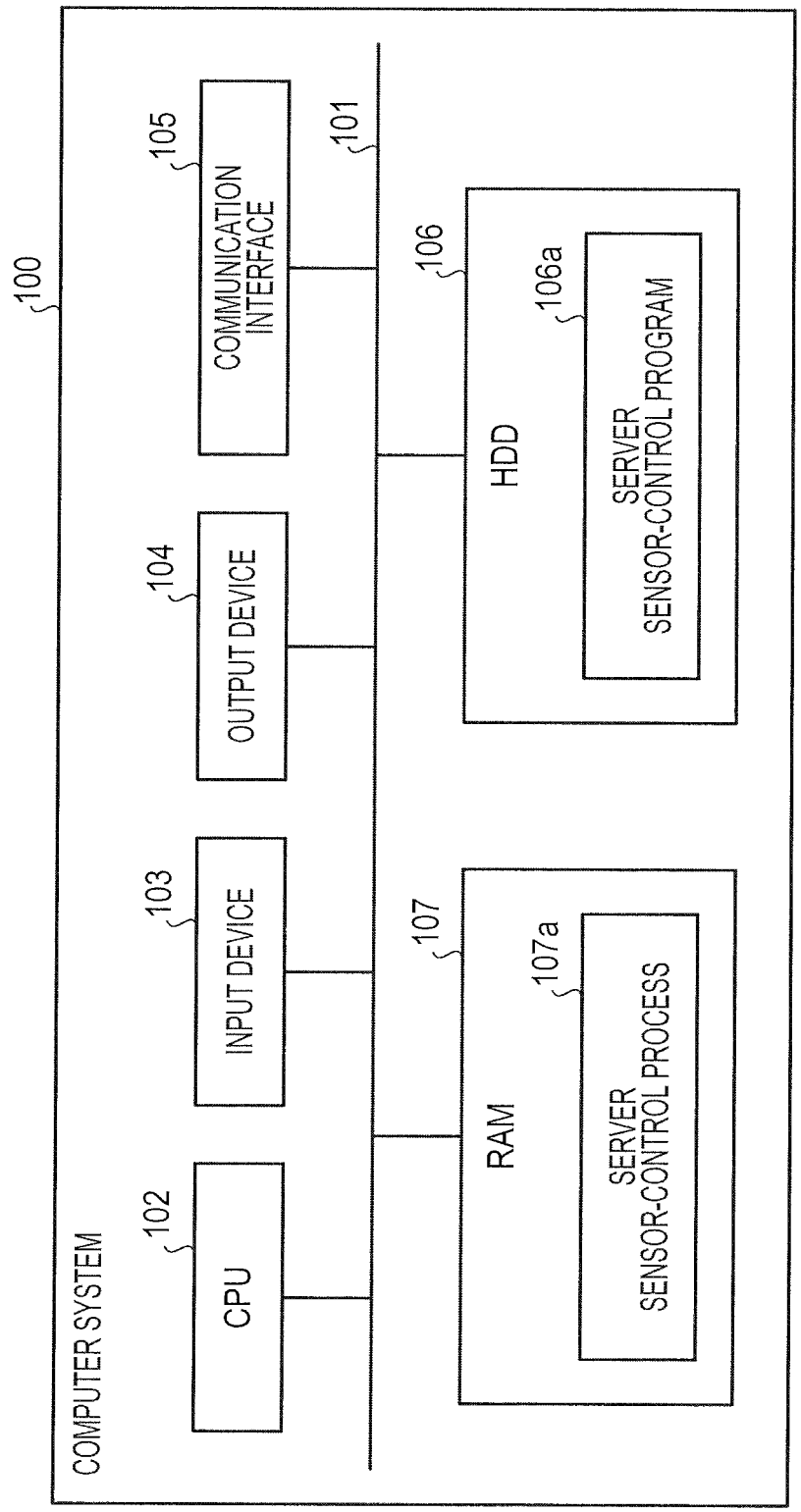
FIG. 11 is a diagram illustrating a hardware configuration of a computer which executes a server-side sensor control program.

FIG. 11 is a diagram illustrating a hardware configuration of a computer which executes a server-side sensor control program. As illustrated in FIG. 11, a computer system 100 include a CPU 102, an input device 103, an output device 104, a communication interface 105, an HDD (Hard Disk Drive) 106, and a RAM (Random Access Memory) 107 which are connected to a bus 101.

The input device 103 includes a mouse and a keyboard. The output device 104 includes a display. The communication interface 105 is an interface such as an NIC (Network Interface Card). The HDD 106 stores information stored in the table illustrated in FIG. 3 along with a server sensor-control program 106*a*. Although the HDD 106 is employed as an example of a recording medium, various programs may be stored in a computer readable recording medium such as a ROM (Read Only Memory), a RAM (Random Access Memory), or a CD-ROM and may be read by a computer. Alternatively, the programs may be obtained when a computer accesses the storage medium remotely located. In this case, the obtained programs to be may be stored in a recording medium included in the computer.

The CPU 102 reads the server sensor-control program 106*a* and executes the server sensor-control program 106*a* in the RAM 107 to thereby activate a server sensor-control process 107*a* which executes the various functions described with reference to FIG. 2 and so on. Specifically, the server sensor-control process 107*a* executes functions similar to those of the data receiver 13, the data comparator 14, the reference data determination device 15, the control signal generator 16, the extra-interval determination device 17, the command generator 18, and the command transmitter 19 illustrated in FIG. 2. As described above, the computer system 100 operates as an information processing apparatus which executes a server sensor control method by reading and executing the programs.

Figure 12:
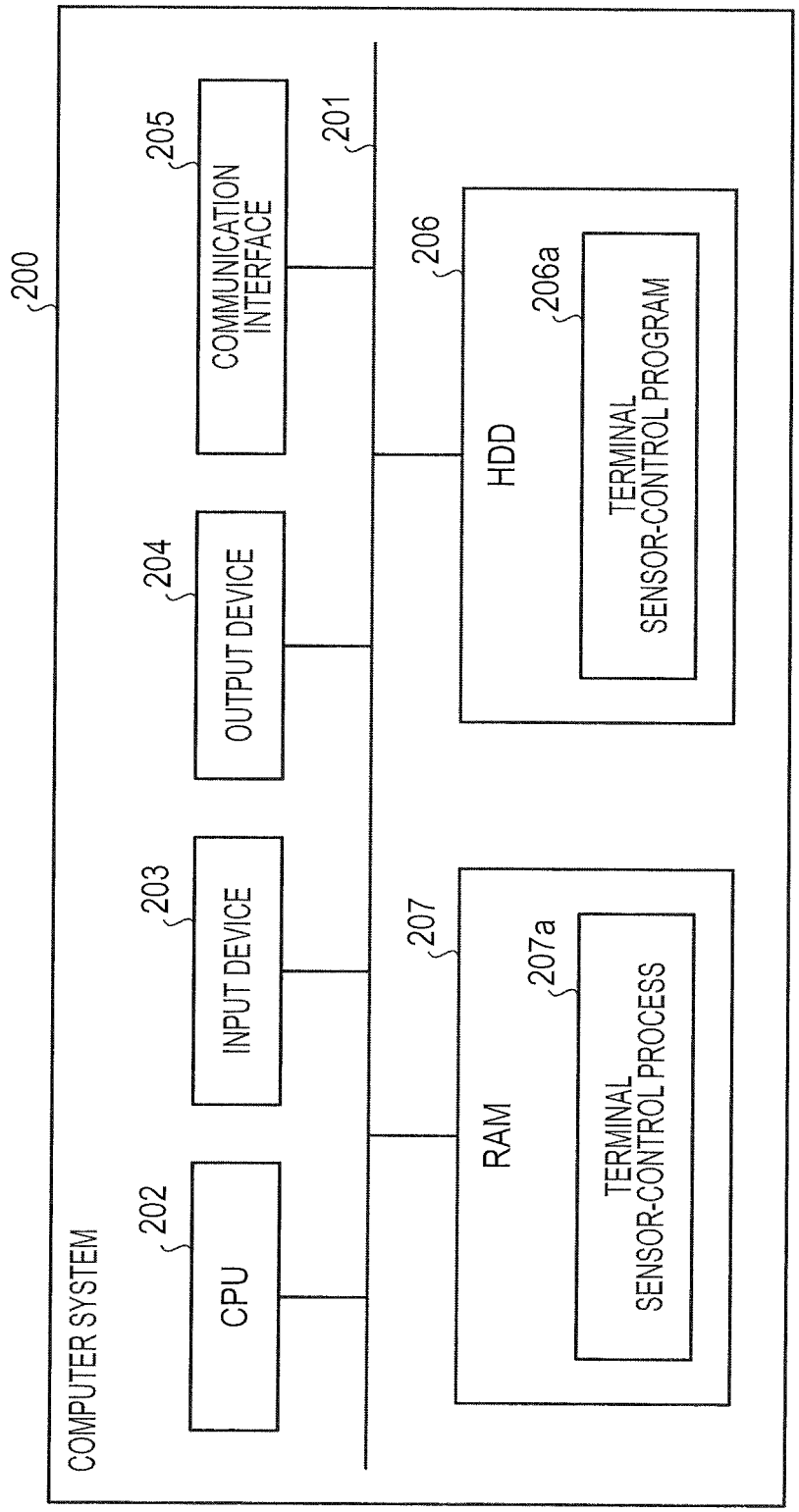
FIG. 12 is a diagram illustrating a hardware configuration of a computer which executes a terminal-side sensor control program.

FIG. 12 is a diagram illustrating a hardware configuration of a computer which executes a terminal-side sensor control program. As illustrated in FIG. 12, a computer system 200 include a CPU 202, an input device 203, an output device 204, a communication interface 205, an HDD 206, and a RAM 207 which are connected to a bus 201.

The input device 203 includes a mouse and a keyboard. The output device 204 includes a display. The communication interface 205 is an interface such as an NIC. The HDD 206 stores the information stored in the data buffer illustrated in FIG. 3 along with a terminal sensor-control program 206*a*. Although the HDD 206 is employed as an example of a recording medium, various programs may be stored in a computer readable recording medium such as a ROM, a RAM, or a CD-ROM and may be read by a computer. Alternatively, the programs may be obtained when a computer accesses a storage medium remotely located. In this case, the obtained programs may be stored in a recording medium included in the computer.

The CPU 202 reads the terminal sensor-control program 206*a* and executes the terminal sensor-control program 206*a* in the RAM 207 to thereby activate a terminal sensor-control process 207*a* which executes the various functions described with reference to FIG. 4 and so on. Specifically, the terminal sensor-control process 207*a* executes functions similar to those of the command receiver 34, the command interpreter 35, the measurement device 36, the sensing application 37, the switch 38, and the data transmitter 39 illustrated in FIG. 4. As described above, the computer system 200 operates as an information processing apparatus which performs a terminal sensor control method by reading and executing a program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A sensor value acquiring method executed by a computer that controls a plurality of mobile terminals to acquire a plurality of sensor values of a plurality of sensors included in the plurality of mobile terminals through a wireless communication link, the method comprising:

acquiring, by the computer, a plurality of sensor values from the plurality of mobile terminals with which the wireless communication link is established, the plurality of sensor values being obtained by the plurality of sensors included in the plurality of mobile terminals;

storing, by the computer, each of the acquired sensor values along with an identifier to identify a mobile terminal with which each of the acquired sensor values was acquired;

comparing, by the computer, the stored sensor values corresponding to different identifiers;

extracting, by the computer, mobile terminals, as mobile terminals in a same condition, with which a difference of compared sensor values is equal to or smaller than a threshold value;

determining, by the computer, from the extracted mobile terminals, at least a first mobile terminal and at least a second mobile terminal, the at least first mobile terminal being controlled to transmit first sensor value with first time interval, the at least second mobile terminal being to be controlled to transmit second sensor value with second time interval which is longer than the first time interval; and transmitting, by the computer, to the at least second mobile terminal an instruction to change the time interval of transmitting the second sensor value to the second time interval.

2. The sensor value acquiring method according to claim 1, wherein the instruction includes an instruction to change a setting of the sensor included in the at least second mobile terminal to disable the sensor to acquire the sensor value, the setting being to be updated with the second time interval.

3. The sensor value acquiring method according to claim 1, further comprising:

comparing the second sensor value acquired from the at least second mobile terminal with the first sensor value acquired from the at least first mobile terminal;

determining whether a difference of compared sensor values is equal to or smaller than a threshold value;

transmitting, when the difference is determined to be equal to or smaller than the threshold value, to the at least second mobile terminal an instruction to change the interval of transmitting the second sensor value from the second time interval to a third time interval which is longer than the second time interval.

4. The sensor value acquiring method according to Claim 3, further comprising:

transmitting to the at least second mobile terminal an instruction to change the interval of transmitting the second sensor value from the third time interval to the second time interval when the difference is determined to be larger than the threshold value.

5. The sensor value acquiring method according to claim 1, further comprising:

acquiring the sensor value from the mobile terminal through a wireless communication in the acquiring;

grouping mobile terminals according to electric wave intensities obtained when sensor values are obtained;

comparing the stored sensor values corresponding to different identifiers for each grouped mobile terminals;

extractinq, for each grouped mobile terminals, mobile terminals, as the mobile terminals in the same condition, with which a difference of compared sensor values;

determining, for each grouped mobile terminals, the at least first mobile terminal and the at least second mobile terminal;

transmitting, for each grouped mobile terminals, to the at least second mobile terminal the instruction to change the time interval of transmitting the second sensor value to the second time interval.

6. The sensor value acquiring method according to claim 1, wherein the wireless communication link is established using a plurality of access points, and the method further comprising:

specifying, by the computer, mobile terminals with which the wireless communication link is established using a same access point among the plurality of access points;

comparing, by the computer, stored sensor values corresponding to different identifiers of the specified mobile terminals;

extracting, by the computer, from the specified mobile terminals, mobile terminals with which the difference of compared sensor values is equal to or smaller than a threshold value; and determining, by the computer, from the extracted mobile terminals, the at least first mobile terminal and the at least second mobile terminal.

7. A sensor control apparatus that controls a plurality of mobile terminals to acquire a plurality of sensor values of a plurality of sensors included in the plurality of mobile terminals, the sensor control apparatus comprising:

a receiver configured to receive the plurality of sensor values obtained by the plurality of sensors included in the plurality of mobile terminals from the plurality of mobile terminals through a communication network;

a storage device configured to store each of the sensor values received by the receiver along with an identifier to identify a mobile terminal with which each of the received sensor values was obtained; and a processor configured to:

compare the stored sensor values corresponding to different identifiers;

extract mobile terminals, as mobile terminals in a same condition, with which a difference of compared sensor values is equal to or smaller than a threshold value;

determine, from the extracted mobile terminals, at least a first mobile terminal and at least a second mobile terminal, the at least first mobile terminal being controlled to transmit first sensor value with first time interval, the at least second mobile terminal being to be controlled to transmit second sensor value with second time interval which is longer than the first time interval; and transmit, to the at least second mobile terminal, an instruction to change the time interval of transmitting the second sensor value to the second time interval.

8. A sensor control method employed in a system including a plurality of mobile terminals having sensors and a server which is coupled to the terminals through a wireless communication link and which controls the plurality of mobile terminals to acquire a plurality of sensor values of the sensors included in the plurality of mobile terminals, the method comprising:

receiving, by the server, the plurality of sensor values from the plurality of mobile terminals;

storing, by the server, each of the received sensor values along with an identifier to identify a mobile terminal with which each of the received sensor values was obtained;

comparing, by the server, the stored sensor values corresponding to different identifiers;

extracting, by the server, mobile terminals, as mobile terminals in a same condition, with which a difference of compared sensor values is equal to or smaller than a threshold value;

determining, by the server, from the extracted mobile terminals, at least a first mobile terminal and at least a second mobile terminal, the at least first mobile terminal being controlled to transmit first sensor value with first time interval, the at least second mobile terminal being to be controlled to transmit second sensor value with second time interval which is longer than the first time interval; and transmitting, by the server, to the at least second mobile terminal an instruction to change the time interval of transmitting the second sensor value to the second time interval.

9. A sensor value acquiring method executed by a computer that controls a plurality of mobile terminals to acquire sensor values of sensors included in the plurality of mobile terminals through a wireless communication link, the method comprising:

acquiring, by the computer, a plurality of sensor values from the plurality of mobile terminals with which the wireless communication link is established, the plurality of sensor values being obtained by the sensors included in the plurality of mobile terminals;

storing, by the computer, each of the acquired sensor values along with an identifier to identify a mobile terminal with which each of the acquired sensor values was acquired;

acquiring, by the computer, electric wave intensities of the wireless communication link when the plurality of sensor values are obtained from the plurality of mobile terminals;

specifying mobile terminals located in a certain area based on the acquired electric wave intensities;

comparing, by the computer, stored sensor values corresponding to different identifiers of the specified mobile terminals;

extracting, by the computer, from the specified mobile terminals, mobile terminals with which a difference of compared sensor values is equal to or smaller than a threshold value;

determining, by the computer, from the extracted mobile terminals, at least a first mobile terminal and at least a second mobile terminal, the at least first mobile terminal being controlled to transmit first sensor value with first time interval, the at least second mobile terminal being to be controlled to transmit second sensor value with second time interval which is longer than the first time interval; and transmitting, by the computer, to the at least second mobile terminal an instruction to change the time interval of transmitting the second sensor value to the second time interval.

* * * * *